(12) United States Patent
Mandt et al.

(10) Patent No.: US 12,456,231 B2
(45) Date of Patent: Oct. 28, 2025

(54) LOSSLESS COMPRESSION WITH PROBABILISTIC CIRCUITS

(71) Applicant: The Regents of the University of California, Oakland, CA (US)

(72) Inventors: Stephan Mandt, Irvine, CA (US); Anji Liu, Los Angeles, CA (US); Guy Van den Broeck, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 238 days.

(21) Appl. No.: 18/141,130

(22) Filed: Apr. 28, 2023

(65) Prior Publication Data

US 2023/0353765 A1    Nov. 2, 2023

Related U.S. Application Data

(60) Provisional application No. 63/336,544, filed on Apr. 29, 2022.

(51) Int. Cl.
*G06T 9/00* (2006.01)
*H04N 19/13* (2014.01)
(Continued)

(52) U.S. Cl.
CPC .............. *G06T 9/002* (2013.01); *G06T 9/005* (2013.01); *H04N 19/13* (2014.11);
(Continued)

(58) Field of Classification Search
CPC ......... G06T 9/002; G06T 9/005; H04N 19/13; H04N 19/134; H04N 19/182; H04N 19/192; H04N 19/42
See application file for complete search history.

(56) References Cited

U.S. PATENT DOCUMENTS 10,411,728 B2 *   9/2019   Flinsenberg .......... G06F 16/285
10,645,389 B2 *   5/2020   He ........................ H04N 19/13
(Continued)

OTHER PUBLICATIONS

Han, Jun, et al. "Deep generative video compression." Proceedings of the 33rd International Conference on Neural Information Processing Systems. (Year: 2019).*

(Continued)

*Primary Examiner* — Scott A Rogers
(74) *Attorney, Agent, or Firm* — Chong IP Law Group

(57) ABSTRACT

Devices, methods, and systems for lossless compression utilizing probabilistic circuits (PCs) are provided. In one embodiments, a method for lossless compression using PCs is provided, the method comprising: receiving image data comprising a plurality of pixels, wherein each of the plurality of pixels is represented by a variable; sequentially compressing the variables one-by-one using conditional probabilities, wherein the conditional probabilities are computed by: calculating at least one marginal; initially setting to 1 a probability p(n) for every PC unit n; defining an $eval_i$ for a set of PC units n that need to be evaluated in an $i^{th}$ iteration; and for i=1 to a dataset D, evaluating PC units n in $eval_i$ using a bottom-up process and computing a target probability; and generating a bitstream using a streaming code for the compressed variables using the conditional probabilities.

20 Claims, 10 Drawing Sheets

(51) Int. Cl.
  *H04N 19/134* (2014.01)
  *H04N 19/182* (2014.01)
  *H04N 19/192* (2014.01)
  *H04N 19/42* (2014.01)

(52) U.S. Cl.
  CPC ......... *H04N 19/134* (2014.11); *H04N 19/182* (2014.11); *H04N 19/192* (2014.11); *H04N 19/42* (2014.11)

(56) References Cited

U.S. PATENT DOCUMENTS

| | | | |
|---|---|---|---|
| 11,375,194 B2* | 6/2022 | Liu | H04N 19/463 |
| 11,405,618 B2* | 8/2022 | He | H04N 19/124 |
| 12,219,143 B2* | 2/2025 | Han | H04N 19/13 |

OTHER PUBLICATIONS

Liu, Anji, Stephan Mandt, and Guy Van den Broeck. "Lossless compression with probabilistic circuits." arXiv preprint arXiv: 2111.11632 (Year: 2021).*

* cited by examiner

LOSSLESS COMPRESSION WITH PROBABILISTIC CIRCUITS

CROSS-REFERENCE TO RELATED APPLICATION

The current application claims priority to U.S. Provisional Patent Application No. 63/336,544, filed on Apr. 29, 2022, the disclosure of which is incorporated herein by reference.

FIELD OF THE INVENTION

The present invention generally relates to data compression and more specifically to lossless compression utilizing probabilistic circuits.

BACKGROUND

Data compression, source coding, or bit-rate reduction may be described as a process of encoding information using fewer bits than an original representation. Generally, an encoder may perform compression and a decoder may perform decompression, which may be a reversal of the compression process to retrieve the original representation.

Typically, particular data compression processes may be either lossy or lossless. Lossy compression may result in some loss of information, where the reduction of bits is typically achieved by removing unnecessary or less important information. In contrast, lossless compression results in no loss of information, where reduction of bits may be provided by identifying and reducing statistical redundancy.

SUMMARY OF THE INVENTION

The various embodiments of the present lossless compression with probabilistic circuits (PCs) contain several features, no single one of which is solely responsible for their desirable attributes. Without limiting the scope of the present embodiments, their more prominent features will now be discussed below. In particular, the present systems, methods, and devices for lossless compression with PCs will be discussed in the context of compression of image data. However, the use of image data is merely exemplary and various other data sets may be used for lossless compress with PCs as appropriate to the requirements of a specific application in accordance with embodiments of the invention. After considering this discussion, and particularly after reading the section entitled "Detailed Description," one will understand how the features of the present embodiments provide the advantages described here.

One aspect of the present embodiments includes the realization that despite extensive progress on image generation, common deep generative architectures may have certain restrictions when applied to lossless compression. For example, Variational Autoencoders (VAEs) suffer from a compression cost overhead due to their latent variables. This overhead can only be partially eliminated with elaborate schemes such as bits-back coding, often resulting in poor single-sample compression rates. To overcome such problems, the present embodiments establish a new class of tractable lossless compression models that permit efficient encoding and decoding: Probabilistic Circuits (PCs). PCs may be described as computation graphs of sum (representing probabilistic mixtures) and product (representing probabilistic factorization) units that may output likelihoods given input features. Further, in practice, the term PC may be referred to by other names such as, but not limited to, "tractable probabilistic models" and "sum-product networks." PCs are a class of neural networks involving $|p|$ computational units that may support efficient marginalization over arbitrary subsets of the D feature dimensions, enabling efficient arithmetic coding, as further described below. In many embodiments, efficient encoding and decoding schemes may be derived that both have time complexity $\mathcal{O}(\log(D)|p|)$, where a naive scheme would have linear costs in D and $|p|$, making the approach highly scalable. Empirically, PC-based (de)compression processes may run 40 times faster than neural compression methods that achieve similar bitrates. By scaling up the traditional PC structure learning pipeline, state-of-the-art results may be achieved on image datasets such as, but not limited to, Modified National Institute of Standards and Technology (MNIST). Furthermore, PCs may be naturally integrated with existing neural compression methods to improve the performance of these base models on various datasets including, but not limited to, natural image datasets. The present embodiments provide results that highlight the potential impact that non-standard learning architectures may have on neural data compression.

Therefore, good generative performance does not imply good compression performance for lossless compression, as the model needs to support efficient processes to encode and decode close to the model's theoretical rate estimate. While both Flow- and VAE-based compression methods support efficient and near-optimal compression under certain assumptions (e.g., the existence of an additional source of random bits), the present embodiments illustrate that PCs are suitable for lossless compression tasks. In various embodiments, this class of tractable models may have a particular structure that allows efficient marginalization of its random variables-a property that, as further described below, enables efficient conditional entropy coding. Thus, the present embodiments introduce PCs as backbone models and develop (de)compression processes that may achieve high compression ratios and high computational efficiency.

Similar to other neural compression methods, the present lossless compression approach may operate in two main phases—(i) learn good PC models that approximate the data distribution, and (ii) compress and decompress samples x with computationally efficient processes. The present lossless compression processes may have four main contributions:

A new class of entropy models. The present embodiments may be the first to use PCs for data compression. In contrast to other neural compression methods, the present embodiments leverage recent innovations in PCs to automatically learn good model architectures from data. With customized GPU implementations and better training pipelines, the present embodiments may be the first to train PC models with competitive performance compared to deep learning models on datasets such as raw MNIST.

A new coding scheme. The present embodiments include development of a provably efficient (Thm. 1) lossless compression processes for PCs that take advantage of their ability to efficiently compute arbitrary marginal probabilities. Specifically, the present embodiments may be the first to show which kinds of marginal probabilities are needed for (de)compression. The proposed processes combine an inference process that computes these marginals efficiently given a learned PC and state-of-the-art (SoTA) streaming codes that use the marginals for en- and decoding.

Competitive compression rates. The present embodiments include experiments showing that on MNIST and EMNIST, PC-based compression processes may achieve SoTA bitrates. On more complex data such as, but not limited to, subsampled ImageNet, PCs may be hybridized with normalizing flows and the present embodiments show that PCs may significantly improve the bitrates of the base normalizing flow models.

Competitive runtimes. The present embodiments may include (de)compressor that may run 40× faster compared to available implementations of neural lossless compressors with near SoTA performance on datasets such as MNIST. An open-source implementation of the PC-based (de)compression process can be found at https://github.com/Juice-jl/PressedJuice.jl.

Notation—Random variables are denoted by uppercase letters (e.g., X) and their assignments by lowercase letters (e.g., x). Analogously, bold uppercase (e.g., X) and lowercase (e.g., x) letters are used to denote sets of variables and their joint assignments, respectively. The set of all possible joint assignments to variables X is denoted val(X).

In a first aspect, a method for lossless compression using PCs is provided, the method comprising: receiving image data comprising a plurality of pixels, wherein each of the plurality of pixels is represented by a variable; sequentially compressing the variables one-by-one using conditional probabilities, wherein the conditional probabilities are computed by: calculating at least one marginal; initially setting to 1 a probability p(n) for every PC unit n; defining an $eval_i$ for a set of PC units n that need to be evaluated in an $i^{th}$ iteration; and for i=1 to a dataset D, evaluating PC units n in $eval_i$ using a bottom-up process and computing a target probability; and generating a bitstream using a streaming code for the compressed variables using the conditional probabilities In an embodiment of the first aspect, the sequentially compressing the variable one-by-one using the conditional probabilities comprises encoding a next variable by defining a left and right side cumulative probabilities of the next variable given one or more already encoded variables In another embodiment of the first aspect, the left and right side cumulative probabilities are defined using a 2D conditional probability that is a quotient of two marginals.

In another embodiment of the first aspect, the calculating the at least one marginal comprises: inputting a PC p having a variable instantiation x; outputting a marginal $F(x)=\{p(x_1, \ldots, x_i)\}_{i=1}^{D}$, wherein D is the dataset.

In another embodiment of the first aspect, each of D terms in F(x) is computed one-by-one.

In another embodiment of the first aspect, each iteration on average re-evaluates only log(D)/D of the PC p.

In another embodiment of the first aspect, the evaluating the PC units in $eval_i$ is performed in a feedforward process to compute the target probability.

In another embodiment of the first aspect, wherein at iteration i, a set of PC units $eval_i$ is selected that guarantees correctness of a target marginal, and contains a minimum number of PC units.

In another embodiment of the first aspect, the guarantee of correctness of the target marginal, and containing the minimum number of PC units is achieved by recognizing types of PC units that can be eliminated for evaluation.

In another embodiment of the first aspect, a root node's probability is equivalently computed using a weighted mixture of probabilities of PC units in $eval_i$.

In a second aspect, a method for lossless compression using PCs is provided, the method comprising non-transitory computer readable storage medium storing a program comprising instructions is provided, the program that, when executed by at least one processor of a computing device, cause the at least one processor to perform operations including: receiving image data comprising a plurality of pixels, wherein each of the plurality of pixels is represented by a variable; sequentially compressing the variables one-by-one using conditional probabilities, wherein the conditional probabilities are computed by: calculating at least one marginal; initially setting to 1 a probability p(n) for every PC unit n; defining an $eval_i$ for a set of PC units n that need to be evaluated in an $i^{th}$ iteration; and for i=1 to a dataset D, evaluating PC units n in $eval_i$ using a bottom-up process and computing a target probability; and generating a bitstream using a streaming code for the compressed variables using the conditional probabilities.

In an embodiment of the second aspect, the sequentially compressing the variable one-by-one using the conditional probabilities comprises encoding a next variable by defining a left and right side cumulative probabilities of the next variable given one or more already encoded variables.

In another embodiment of the second aspect, the left and right side cumulative probabilities are defined using a 2D conditional probability that is a quotient of two marginals.

In another embodiment of the second aspect, the calculating the at least one marginal comprises: inputting a PC p having a variable instantiation x; and outputting a marginal $F(x)=\{p(x_1, \ldots, x_i)\}_{i=1}^{D}$, wherein D is the dataset.

In another embodiment of the second aspect, each of D terms in F(x) is computed one-by-one.

In another embodiment of the second aspect, each iteration on average re-evaluates only log(D)/D of the PC p.

In another embodiment of the second aspect, the evaluating the PC units in $eval_i$ is performed in a feedforward process to compute the target probability.

In another embodiment of the second aspect, at iteration i, a set of PC units $eval_i$ is selected that guarantees correctness of a target marginal, and contains a minimum number of PC units.

In another embodiment of the second aspect, the guarantee of correctness of the target marginal, and containing the minimum number of PC units is achieved by recognizing types of PC units that can be eliminated for evaluation.

In another embodiment of the second aspect, a root node's probability is equivalently computed using a weighted mixture of probabilities of PC units in $eval_i$.

BRIEF DESCRIPTION OF THE DRAWINGS

The various embodiments of the present lossless compression utilizing probabilistic circuits (PCs) will be discussed in detail with an emphasis on highlighting the advantageous features. These embodiments depict the novel and non-obvious features of lossless compression utilizing PCs shown in the accompanying drawings, which are for illustrative purposes only. These drawings include the following figures.

DETAILED DESCRIPTION OF THE DRAWINGS

Figure 1:
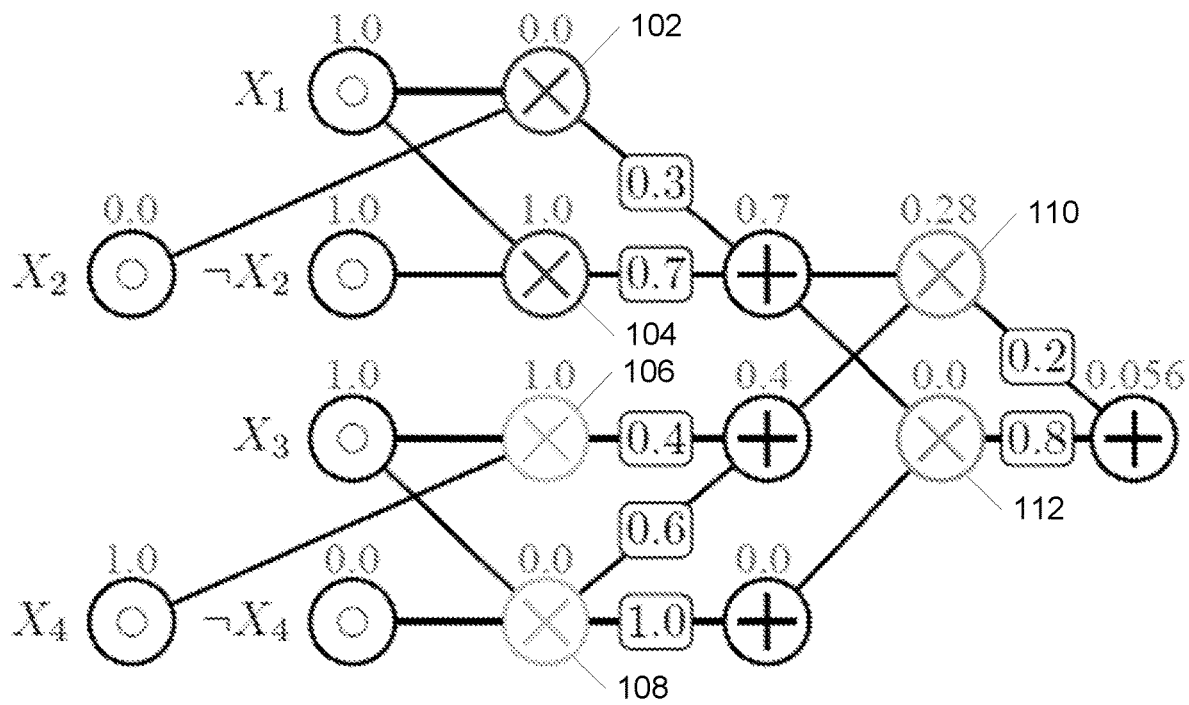
FIG. 1 is a diagram illustrating a structured decomposability (SD) PC in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features. Turning now to the drawings, lossless compression utilizing PCs are provided. In many embodiments, one of the keys to lossless compression may be to reliably estimate how frequently any given "symbol" occurs that one desires to compress (e.g., words in language, patches in image data, or DNA sequences for compressing DNA data, etc.). Knowing these probabilities, one can convert frequent symbols into short bit representations, and rare symbols into longer bit representations. For complex data, probability models may be needed to estimate the probabilities of these symbols. The present embodiments utilize machine learning, and in particular generative modeling, since generative models try to assign probabilities to each possible data point.

Existing deep generative models for compression are suboptimal as they can estimate the data probabilities only indirectly and in a very costly fashion. To overcome such problems, the present embodiments analyze a new class of generative models and used them for data compression: Probabilistic Circuits (PCs). These models estimate all relevant probabilities needed for compression in a fast and direct fashion without the need of further approximations. In various embodiments, by scaling up the traditional PC learning pipeline, state-of-the-art compression results may be achieved. For example, compression results on image patch data are provided and, in particular, better results than both classical and recently proposed neural compression schemes are shown. In addition, a significant speed improvement is illustrated: the present embodiments of PC-based (de)compression processes run 40× faster than neural compression methods that achieve similar bitrates.

Probabilistic Circuits (PCs) are an umbrella term of a wide variety of Tractable Probabilistic Models (TPMs). They provide a set of succinct definitions for popular TPMs such as Sum-Product Networks, Arithmetic Circuits, and Probabilistic Sentential Decision Diagrams. The syntax and semantics of a PC are defined as follows.

Definition 1 (Probabilistic Circuits). A PC p(X) represents a probability distribution over X via a parametrized directed acyclic graph (DAG) with a single root node $n_r$. Similar to neural networks, every node of the DAG defines a computational unit. Specifically, each leaf node corresponds to an input unit; each inner node n represents either a sum or a product unit that receives inputs from its children, denoted in (n). Each node n encodes a probability distribution $p_n$, defined as follows:

$$p_n(x) := \begin{cases} f_n(x) & \text{if } n \text{ is an input unit,} \\ \sum_{c \in in(n)} \theta_{n,c} \cdot p_c(x) & \text{if } n \text{ is a sum unit,} \\ \prod_{c \in in(n)} p_c(x) & \text{if } n \text{ is a product unit,} \end{cases} \quad (2)$$

where $f_n(\cdot)$ is an univariate input distribution (e.g., Gaussian, Categorical), and $\theta_{n,c}$ denotes the parameter that corresponds to edge (n, c). Intuitively, sum and product units encode weighted mixtures and factorized distributions of their children's distributions, respectively. To ensure that a PC models a valid distribution, the present embodiments assume the parameters associated with any sum unit n are normalized: $\forall n, \Sigma_{c \in in(n)} \theta_{n,c} = 1$. Further, the present embodiments may assume w.l.o.g. that a PC alternates between sum and product units before reaching an input unit. The size of a PC p, denoted |p|, is the number of edges in its DAG.

The present embodiments may focus on PCs that may compute arbitrary marginal queries in time linear in their size, since this may be needed to unlock the efficient (de)compression process. In order to support efficient marginalization, PCs typically need to be decomposable (Def. 2), which is a property of the (variable) scope φ(n) of PC units n, that is, the collection of variables defined by all its descendent input units. Note—Another property called smoothness is may also be needed to compute marginals efficiently. However, since enforcing smoothness on any structured-decomposable PC typically imposes at most an almost-linear increase in its size the present embodiments omit introducing it here (all PCs described herein are structured-decomposable).

Definition 2 (Decomposability). A PC is decomposable if for every product unit n, its children have disjoint scopes: $\forall c_1, c_2 \in in(n) \ (c_1 \neq c_2), \ \varphi(c_1) \cap \varphi(c_2) = \emptyset$.

A diagram illustrating a structured decomposability (SD) PC in accordance with an embodiment of the invention is shown in FIG. 1. The feedforward order is from left to right; inputs are assumed to be boolean variables; parameters are labeled on the corresponding edges. Probability of each unit given input assignment $x_1, \underline{x_2}, x_4$ is labeled blue next to the corresponding unit.

In reference to FIG. 1, all product units are decomposable (e.g., first product units 102, 104, second product units 106, 108, and third product units 110, 112). For example, each first product unit 102, 104 (whose scope is $\{X_1, X_2\}$) has two children with disjoint scopes $\{X_1\}$ and $\{X_2\}$, respectively. In addition to Def. 2, another structural property, structured decomposability (SD), may be introduced, which may guarantee computational efficiency of the proposed (de)compression process.

Definition 3 (Structured decomposability). A PC is structured-decomposable if (i) it is decomposable and (ii) for every pair of product units (m, n) with identical scope (i.e., φ(m)=φ(n)), we have that |in(m)|=|in(n)| and the scopes of their children are pairwise identical: $\forall_i \in \{1, \ldots, |in(m)|\}$, $\varphi(cm_i) = \varphi(cn_i)$, where $cm_i$ and $cn_i$ are the ith child unit of m and n.

In further reference to FIG. 1, the PC is SD because for all three groups of product units with the same scope (grouped by their colors, e.g., group 1 including first product units 102, 104, group 2 including second product units 106, 108, and group 3 including third product units 110, 112), their children divide the variable scope in the same way. For example, the children of both third product units 110, 112 decompose the scope $\{X_1, X_2, X_3, X_4\}$ into $\{X_1, X_2\}$ and $\{X_3, X_4\}$.

As a key sub-routine in the present processes, how to compute marginal queries given a smooth and (structured-) decomposable PC in $\mathcal{O}(|p|)$ time is provided. First, probabilities to every input unit may be assigned: for an input unit n defined on variable X, if evidence is provided for X in the query (e.g., X=x or X<x), we assign to n the corresponding probability (e.g., p(X=x), p(X<x)) according to $f_n$ in Eq. (2) (Eq. 2 is provided below); if evidence of X is not given, probability 1 is assigned to n. Next, a feedforward (children before parents) traverse of inner PC units and compute their probabilities following Eq. (2) may be conducted. The probability assigned to the root unit is the final answer of the marginal query. Concretely, consider computing $p(x_1, \underline{x_2}, x_4)$ for the PC in FIG. 1. This is done by (i) assigning probabilities to the input units w.r.t. the given evidence $x_1$, $\underline{x_2}$, and $x_4$ (assign 0 to the input unit labeled $X_2$ and $X_4$ as they contradict the given evidence; all other input units are assigned probability 1), and (ii) evaluate the probabilities of sum/product units following Eq. (2). Evaluated probabilities are labeled next to the corresponding units, hence the marginal probability at the output is $p(x_1, \underline{x_2}, x_4)$=0.056. Tractability considerations in lossless compression in accordance with embodiments of the invention are further described below.

Tractability Matters in Lossless Compression

The goal of lossless compression processes is to map every input sample to an output codeword such that (i) the original input can be reconstructed from the codeword, and (ii) the expected length of the codewords is minimized. Practical (neural) lossless compression processes operate in two main phases—learning and compression. In the learning phase, a generative model p(X) may be learned from a dataset $\mathcal{D} := \{x^{(i)}\}_{i=1}^N$. According to Shannon's source coding theorem (Shannon, 1948), the expected codeword length is lower-bounded by the negative cross-entropy between the data distribution $\mathcal{D}$ and the model distribution p(X) (i.e., $-\mathbb{E}_{x \sim \mathcal{D}}[\log p(x)]$), rendering it a natural and widely used objective to optimize the model.

In the compression phase, compression processes take the learned model p and samples x as input and generate codewords whose expected length approaches the theoretical limit (i.e., the negative cross-entropy between $\mathcal{D}$ and p). Although there exist various close-to-optimal compression schemes (e.g., Huffman Coding (Huffman, 1952) and Arithmetic Coding (Rissanen, 1976)), a natural question to ask is what are the requirements on the model p such that compression processes can utilize it for encoding/decoding in a computationally efficient manner? In the present embodiments, the advantages of tractable probabilistic models for lossless compression by introducing a concrete class of models that are expressive and support efficient encoding and decoding are highlighted.

To encode a sample x, a standard streaming code operates by sequentially encoding every symbol $x_i$ into a bitstream b, such that $x_i$ occupies approximately $-\log p(x_i|x_1, \ldots, x_{i-1})$ bits in b. As a result, the length of b is approximately $-\log p(x)$. For example, Arithmetic Coding (AC) encodes the symbols $\{x_i\}_{i=1}^D$ (define D:=|X| as the number of features) sequentially by successively refining an interval that represents the sample, starting from the initial interval [0,1). To encode $x_i$, the process partitions the current interval [a,b) using the left and right side cumulative probability of $x_i$:

$$l_i(x_i) := p(X_i < x_i | x_1, \ldots, x_{i-1}), h_i(x_i) :=\\ p(X_i \leq x_i | x_1, \ldots, x_{i-1}). \quad (1)$$

Specifically, the process may update [a, b) to the following: $[a+(b-a)\cdot l_i(x_i), a+(b-a)\cdot h_i(x_i))$, which is a sub-interval of [a, b). Finally, AC picks a number within the final interval that has the shortest binary representation. This number is encoded as a bitstream representing the codeword of x. Upon decoding, the symbols $\{x_i\}_{i=1}^D$ may be decoded sequentially: at iteration i, variable $X_1$ may be decoded by looking up its value x such that its cumulative probability (i.e., $l_i(x)$) matches the subinterval specified by the codeword and $x_i, \ldots, x_{i-1}$ (Rissanen, 1976); the decoded symbol $x_i$ may then be used to compute the following conditional probabilities (i.e., $l_j(x)$ for j>i). Despite implementation differences, computing the cumulative probabilities $l_i(x)$ and $h_i(x)$ may be needed for many other streaming codes (e.g., rANS). For these streaming codes, the main computation cost of both the encoding and decoding process comes from calculating $l_i(x)$ and $h_i(x)$.

The main challenge for the above (de)compression process may be to balance the expressiveness of p and the computation cost of $\{l_i(x), h_i(x)\}_{i=1}^D$. On the one hand, highly expressive probability models such as energy-based models may potentially achieve high compression ratios at the cost of slow runtime, which is due to the requirement of estimating the model's normalizing constant. On the other hand, models that make strong independence assumptions (e.g., n-gram, fully-factorized) may be cheap to evaluate but lack the expressiveness to model complex distributions over structured data such as images. Note—Flow-model-based neural compression methods may adopt p defined on mutually independent latent variables (denoted Z), and may improve expressiveness by learning bijection functions between Z and X (i.e., the input space). This is orthogonal to the present embodiments of directly learn better p. Furthermore, one can naturally integrate the proposed expressive p with bijection functions and achieve better performance as further described below.

The present embodiments explore a middle-ground between the above two extremes. Specifically, it may be asked: are there probabilistic models that are both expressive and permit efficient computation of the conditional probabilities in Eq. (1)? This question may be answered in the affirmative by establishing a new class of tractable lossless compression processes using Probabilistic Circuits (PCs), which are neural networks that can compute various probabilistic queries efficiently. In the following, the empirical and theoretical results of the present (de)compression processes are further described below.

Theoretical findings may include: the present encoding and decoding processes enjoy time complexity $\mathcal{O}(\log(D) \cdot |p|)$, where $|p| \geq D$ is the PC model size. The backbone of both processes, formally introduced below in the "Computationally Efficient (De)compression with PCs," is a process that may compute the 2×D conditional probabilities $\{l_i(x), h_i(x)\}_{i=1}^D$ given any x efficiently, as justified by the following theorem.

Theorem 1 (informal). Let x be a D-dimensional sample, and let p be a PC model of size |p, as proposed in the present embodiments. Thus, computing all quantities $\{l_i(x_i), h_i(x_i)\}_{i=1}^D$ takes $\mathcal{O}(\log(D) \cdot |p|)$ time. Therefore, en- or decoding x with a streaming code (e.g., Arithmetic Coding) takes $\mathcal{O}(\log(D) \cdot |p| + D) = \mathcal{O}(\log(D) \cdot |p|)$ time.

The properties of PCs that enable this efficient lossless compression process will be described below, and the backbone inference process with $\mathcal{O}(\log(D)\cdot|p|)$ time complexity will later be shown as Process 1. Table 1 provides an (incomplete) summary of empirical results. First, the PC-based lossless compression process is fast and competitive. As shown in Table 1, the small PC model achieved a near-SoTA bitrate while being ~15× faster than other neural compression processes with a similar bitrate. Next, PCs can be integrated with Flow-NAE-based compression methods. As illustrated in Table 1 (reproduced above), the integrated model significantly improved performance on sub-sampled ImageNet compared to the base IDF model. Computationally efficient (de)compression with PCs in accordance with embodiments of the invention are further discussed below.

Computationally Efficient (De)Compression with PCS

As described above, the task of lossless compression may be considered as calculating conditional probabilities $\{l_i(x), h_i(x)\}_{i=1}^D$ given p and x. This section takes PCs into consideration and demonstrates how these queries can be computed efficiently. In the following, a relevant background on PCs and then the PC-based (de)compression processes are discussed. Then, the optimality and speed of the proposed compressor and decompressor are empirically evaluated.

all variables (e.g., $x_1$, $x_2$, $x_3$, and $x_4$) autoregressively. For example, suppose one has encoded $x_1$, $x_2$ and the next variable $x_3$ will be encoded (e.g., pixels $X_1$ 204 and $X_2$ 206 have been sent and $X_3$ 208 is being sent). To encode the next variable $x_3$, the left and right side cumulative probability 220 of $x_3$ given $x_1$ and $x_2$, which are defined as $l_3(x_3)$ and $h_3(x_3)$, respectively, may be computed. A streaming code 230 may then encodes $x_3$ into a bitstream 240 using these probabilities 220. Decoding by a decoder 251 may also be performed autoregressively. Specifically, after $x_1$ and $X_2$ are decoded, the same streaming code 260 may use the information from the bitstream 240 and the conditional distribution $p(x_3|x_1, x_2)$ 254 to decode $x_3$.

Therefore, the main computation cost of the above en- and decoding procedures comes from calculating the 2D conditional probabilities $\{l_i(x), h_i(x)\}_{i=1}^D$ efficiently w.r.t. any x. Since every conditional probability can be represented as the quotient of two marginals, it is equivalent to compute the two following sets of marginals: $F(x):=\{p(x_1, \ldots, x_i)\}_{i=1}^D$ and $G(x):=\{p(x_1, \ldots, x_{i-1}, X_i<x_i)\}_{i=1}^D$.

As a direct application of the marginal process described in the "Background: Probabilistic Circuits" section above, for every $x \in val(X)$, computing the 2D marginals $\{F(x),$

TABLE 1

An (incomplete) summary of our empirical results.
"Comp." stands for compression.

| | MNIST (10,000 test images) | | | | | |
|---|---|---|---|---|---|---|
| Method | Theoretical bpd | Comp. bpd | En- & decoding time | Method | ImageNet32 Theoretical bpd | ImageNet64 Theoretical bpd |
| PC (small) | 1.26 | 1.30 | 53 | PC + IDF | 3.99 | 3.71 |
| PC (large) | 1.20 | 1.24 | 168 | IDF | 4.15 | 3.90 |
| IDF | 1.90 | 1.96 | 880 | RealNVP | 4.28 | 3.98 |
| BitSwap | 1.27 | 1.31 | 904 | Glow | 4.09 | 3.81 |

Efficient (De-)Compression with Structured-Decomposable PCs

Figure 2:
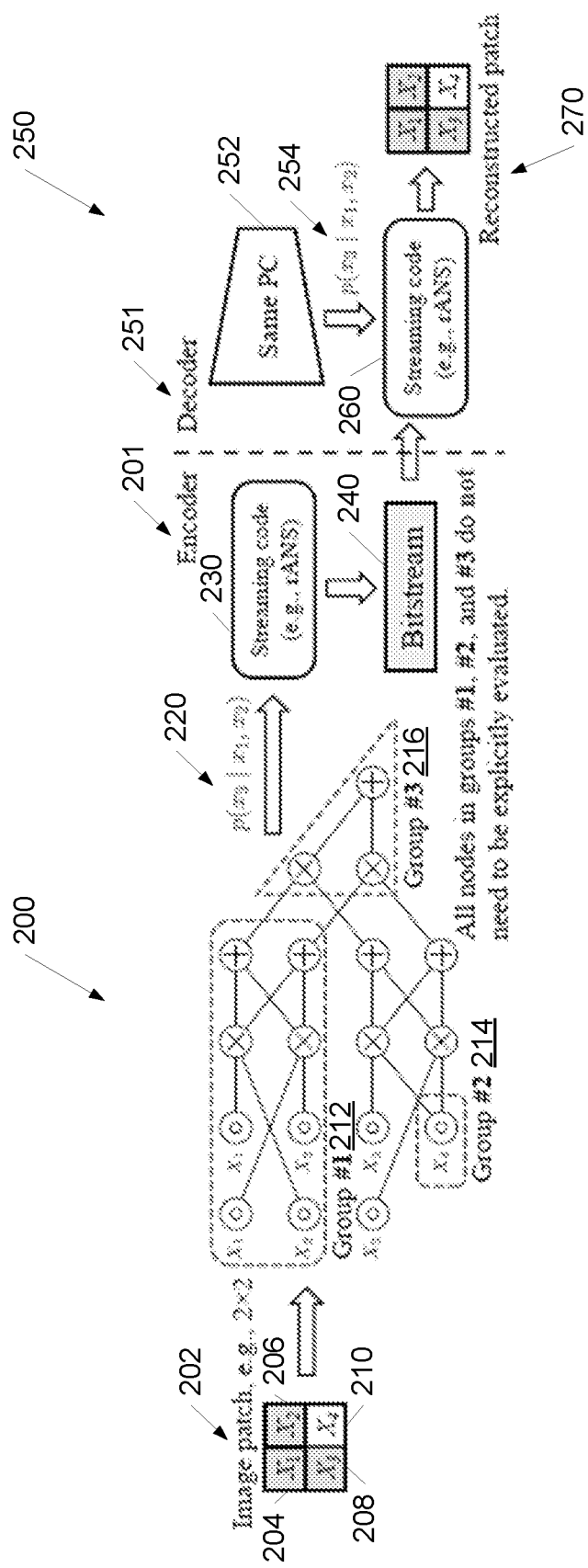
FIG. 2 is a diagram illustrating an overview of a PC-based (de)compressor in accordance with an embodiment of the invention.

A diagram illustrating an overview of a PC-based (de)compressor in accordance with an embodiment of the invention is shown in FIG. 2. The encoder's side 200 sequentially compresses variables one-by-one using the conditional probabilities given all sent variables. These probabilities are computed efficiently using Process 1, as described further below. Finally, a streaming code 230 uses conditional probabilities to compress the variables into a bitstream 240. On the decoder's side 250, a streaming code 260 decodes the bitstream 240 to reconstruct the image 270 with the conditional probabilities 254 computed by the PC 252.

In reference to FIG. 2, the proposed PC-based (de)compression process is outlined. Consider compressing a 2-by-2 image 202, whose four pixels are denoted as $X_1$ 204, $X_2$ 206, $X_3$ 208, and $X_4$ 210. As discussed above, the encoder 201 converts the image 202 into a bitstream 240 by encoding $G(x)\}$ take $\mathcal{O}(D\cdot|p|)$ time. However, the linear dependency on D could render compression and decompression extremely time-consuming.

One may significantly accelerate the en- and decoding times if the PC is structured-decomposable (see Definition 3). To this end, one may introduce a method that computes $F(x)$ and $G(x)$ in $\mathcal{O}(\log(D)\cdot|p|)$ time (instead of $\mathcal{O}(D\cdot|p|)$), given a smooth and structured-decomposable PC p. For ease of presentation, discussion of how to compute $F(x)$ is provided—the values $G(x)$ can be computed analogously. Note—the only difference between the computation of the ith term of $F(x)$ and the ith term of $G(x)$ is in the value assigned to the inputs for variable $X_i$ (i.e., probabilities $p_n(X_i=x)$ vs. $p_n(X_i<x)$).

Before proceeding with a formal argument, a high-level explanation of the acceleration is provided. In practice, one only needs to evaluate a small fraction of PC units to compute each of its D marginals.

---

Process 1 Compute F(x) (see Process 3 for details)

1:   Input: A smooth and structured-decomposable PC p, variable instantiation x
2:   Output: $F_\pi(x) = \{p(x_1,\ldots,x_i)\}_{i=1}^D$
3:   Initialize: The probability $p(n)$ of every unit n is initially set to 1
4:       $\forall i$, $eval_i \leftarrow$ the set of PC units n that need to be evaluated in the ith iteration -continued Process 1 Compute F(x) (see Process 3 for details)

5: for i = 1 to D do
6:  ⌊ Evaluate PC units in $eval_i$ in a bottom-up manner and compute $p(x_1,...,x_i)$ This is different from regular neural networks and the key to speeding up the computation of F(x). In contrast to neural networks, changing the input only slightly will leave most activations unchanged for structured-decomposable PCs. One may make use of this property by observing that adjacent marginals in F(x) only differ in one variable—the ith term only adds evidence $x_i$ compared to the (i−1)th term. It may be shown that such similarities between the marginal queries will lead to a process that guarantees $\mathcal{O}(\log(D) \cdot |p|)$ overall time complexity.

An informal version of the present method is shown in Process 1. In the main loop (lines 5-6), the D terms in F(x) are computed one-by-one. Although the D iterations seem to suggest that the process scales linearly with D, it may be highlighted that each iteration on average re-evaluates only $\log(D)/D$ of the PC. Therefore, the computation cost of Process 1 scales logarithmically w.r.t. D. The set of PC units need to be re-evaluated, $eval_i$, is identified in line 4, and lines 6 evaluates these units in a feedforward manner to compute the target probability (i.e., $p(x_1, \ldots, x_i)$).

Specifically, to minimize computation cost, at iteration i, one may select a set of PC units evali that (i) guarantees the correctness of the target marginal, and (ii) contains the minimum number of units. This may be achieved by recognizing three types of PC units that can be safely eliminated for evaluation. Take the PC shown in FIG. 2 as an example. Suppose we want to compute the third term in F(x) (i.e., $p(x_1, x_2, x_3)$). First, all PC units in Group #1 212 do not need to be re-evaluated since their value only depends on $x_i$ and $x_2$ and hence remains unchanged. Next, PC units in Group #2 214 evaluate to 1. This can be justified from the two following facts: (i) input units correspond to $X_4$ have probability 1 while computing $p(x_1, x_2, x_3)$; (ii) for any sum or product unit, if all its children have probability 1, it also has probability 1 following Eq. (2). Finally, although the activations of the PC units in Group #3 216 will change when computing $p(x_1, x_2, x_3)$, one does not need to explicitly evaluate these units—the root node's probability can be equivalently computed using the weighted mixture of probabilities of units in $eval_i$. The correctness of this simplification step is justified below.

The idea of partially evaluating a PC originates from the Partial Propagation (PP) method. However, PP can only prune away units in Group #2. Thanks to the specific structure of the marginal queries, the present embodiments are able to also prune away units in Groups #1 and #3.

Finally, additional technical details to rigorously state the complexity of Process 1 are provided. First, one needs the variables X to have a specific order determined by the PC p. To reflect this change, F(x) to $F_\pi(x):=\{p(x_{\pi 1}, \ldots, x_{\pi i})\}_{i=1}^D$ may be generalized, where π defines some variable order over X, i.e., the ith variable in the order defined by π is $X_{\pi i}$. Next, a technical assumption is given and then the correctness and efficiency of Process 1 may be formally justified when using an optimal variable order π*.

Definition 4. For a smooth structured-decomposable PC p over D variables, for any scope φ, denote nodes (p, φ) as the set of PC units in p whose scope is φ. It may be said that p is balanced if for every scope φ' that is equal to the scope of any unit n in p, we have |nodes (p, φ')|=$\mathcal{O}$(|p|/D).

Theorem 1. For a smooth structured-decomposable balanced PC p over D variables X and a sample x, there exists a variable order π*, s.t. Process 3 correctly computes $F_{\pi*}(x)$ in $\mathcal{O}(\log(D) \cdot |p|)$ time.

Proof First note that Process 3 is a detailed version of Process 1. The high-level idea of the proof is to first show how to compute the optimal variable order π* for any smooth and structured-decomposable PC. Next, the correctness of Process 3 is justified by showing (i) one only needs to evaluate units that satisfy the criterion in line 6 of Process 3 and (ii) weighing the PC units with the top-down probabilities, as further described below, always give the correct result. Finally, one may use induction (on D) to demonstrate Process 3 computes $\mathcal{O}(\log(D) \cdot |p|)$ PC units in total if π* is used (details provided further below).

While Def. 4 may seem restrictive at first glance, it may be highlighted that most existing PC structures such as EiNets, RAT-SPNs and HCLTs are balanced, as further discussed below. Once all marginal probabilities are calculated, samples x can be en- or decoded autoregressively with any streaming codes in time $\mathcal{O}(\log(D)|p|)$. Specifically, the present implementation adopted the widely used streaming code rANS.

TABLE 2

Efficiency and optimality of the (de)compressor. The compression (resp. decompression) time are the total computation time used to encode (resp. decode) all 10,000 MNIST test samples on a single TITAN RTX GPU. The proposed (de)compressor for structured-decomposable PCs is 5-40x faster than IDF and BitSwap and only leads to a negligible increase in the codeword bpd compared to the theoretical bpd. HCLT is a PC model that will be introduced below.

| Method | # parameters | Theoretical bpd | Codeword bpd | Comp. time (s) | Decomp. time (s) |
| --- | --- | --- | --- | --- | --- |
| PC (HCLT, M = 16) | 3.3M | 1.26 | 1.30 | 9 | 44 |
| PC (HCLT, M = 20) | 5.1M | 1.22 | 1.26 | 15 | 86 |
| PC (HCLT, M = 32) | 7.0M | 1.20 | 1.24 | 26 | 142 |
| IDF | 24.1M | 1.90 | 1.96 | 288 | 9 |
| BitSwap | 2.8M | 1.27 | 1.31 | 578 | 326 |

Empirical Evaluation

The present embodiments were compared with a Flow-model-based (IDF by Hoogeboom et al. (2019)) and VAE-based (BitSwap by Kingma et al. (2019)) neural compression methods using the MNIST dataset. First bitrates were evaluated. As shown in Table 2 (reproduced above), the PC (de)compressor achieved compression rates close to its theoretical rate estimate—codeword bpds only have ~0.04 loss w.r.t. the corresponding theoretical bpds. It may be noted that PC and IDF have an additional advantage: their reported bitrates were achieved while compressing one sample at a time; however, BitSwap needs to compress sequences of 100 samples to achieve 1.31 codeword bpd.

Next, efficiency may be considered. While achieving a better codeword bpd (i.e., 1.30) compared to IDF and BitSwap, a relatively small PC model (i.e., HCLT, M=16) encodes (resp. decodes) images 30× (resp. 10×) faster than both baselines. Furthermore, a bigger PC model (M=32) with 7M parameters achieved codeword bpd 1.24, and is still 5× faster than BitSwap and IDF. Note that at the cost of increasing the bitrate, one can significantly improve the en- and decoding efficiency. For example, by using a small VAE model, others have managed to compress and decompress 10,000 binarized MNIST samples in 3.26 s and 2.82 s, respectively.

Related work As hinted by Tractability Matters in Lossless Compression section, the present embodiments seek to directly learn probability distributions p(X) that are expressive and support tractable (de)compression. In contrast, existing Flow-based and VAE-based neural lossless compression methods may be based on an orthogonal idea: they adopt simple (oftentimes fully factorized) distributions over a latent space Z to ensure the tractability of encoding and decoding latent codes z, and learn expressive neural networks that "transmit" probability mass from Z to the feature space X to compress samples x indirectly. It may be noted that both ideas can be integrated naturally: the simple latent distributions used by existing neural compression processes can be replaced by expressive PC models, as further described below.

Although specific PCs and PC-based (de)compressors are discussed above with respect to FIGS. 1-2, any of a variety of PCs and PC-based (de)compressors as appropriate to the requirements of a specific application may be utilized in accordance with embodiments of the invention. Scaling up learning and Inference of PCs in accordance with embodiments of the invention are discussed further below.

Scaling Up Learning and Inference of Pcs

Being equipped with an efficient (de)compressor, the next goal is to learn PC models that may achieve good generative performance on various datasets. Although recent breakthroughs have led to PCs that can generate CelebA and SVHN images, PCs have not been shown to have competitive (normalized) likelihoods on image datasets, which directly influence compression rates. In this section, it will be shown that Hidden Chow-Liu Trees (HCLTs), a PC model initially proposed for simple density estimation tasks containing binary features, may be scaled up to achieve state-of-the-art performance on various datasets such as, but not limited to, image datasets. An introduction of HCLTs and a demonstration of how to scale up their learning and inference (for compression), along with empirical evidence, is provided below.

Hidden Chow-Liu Trees

Figures 3A, 3B, 3C, 3D:
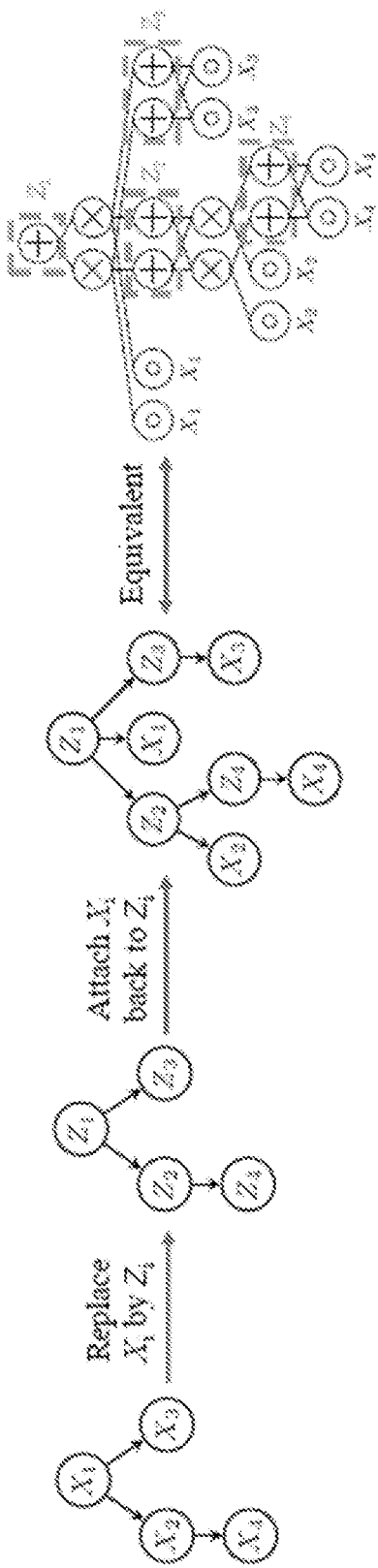
FIGS. 3A-D are diagrams illustrating a process for constructing a Hidden Chow-Liu Tree (HCLT) PC given a dataset D in accordance with an embodiment of the invention.

Hidden Chow-Liu Trees (HCLTs) are smooth and structured-decomposable PCs that combine the ability of Chow-Liu Trees (CLTs) to capture feature correlations and the extra expressive power provided by latent variable models. Every HCLT can be equivalently represented as a Probabilistic Graphical Model (PGM) with latent variables. Diagrams illustrating a process for constructing a Hidden Chow-Liu Tree (HCLT) PC given a dataset D with 4 features in accordance with an embodiment of the invention are shown in FIGS. 3A-D. FIG. 3(a) shows construction of the Chow-Liu Tree over variables $X_1, \ldots, X_4$ using D, as further described below. FIG. 3(b) shows replacing every variable $X_1$ by its corresponding latent variable $Z_i$, as further described below. FIG. 3(c) shows attaching all $X_i$ back to their respective latent variables $Z_i$, as further described below. FIG. (d) is a PGM representation of HCLT that is compiled into an equivalent PC, as further described below.

Specifically, FIGS. 3(a)-(c) demonstrate how to construct the PGM representation of an example HCLT. Given a dataset $\mathcal{D}$ containing 4 features $X=X_1, \ldots, X_4$, a CLT w.r.t. X (FIG. 3(a)) may first be learned. To improve expressiveness, latent variables may be added to the CLT by the two following steps: (i) replace observed variables $X_i$ by their corresponding latent variables $Z_i$, which are defined to be categorical variables with M (a hyperparameter) categories (FIG. 3(b)); (ii) connect observed variables $X_i$ with the corresponding latent variables $Z_i$ by directed edges $Z_i \rightarrow X_1$. This leads to the PGM representation of the HCLT shown in FIG. 3(c). Finally, a PC that represents an equivalent distribution w.r.t. the PGM in FIG. 3(c) is generated, which is detailed below. FIG. 3(d) illustrates an HCLT that is equivalent to the PGM shown in FIG. 3(c) (with M=2).

Recent advances in scaling up learning and inference of PCs largely rely on the regularity of the PC architectures they used—the layout of the PCs can be easily vectorized, allowing them to use well-developed deep learning packages such as PyTorch. However, due to the irregular structure of learned CLTs, HCLTs cannot be easily vectorized. To overcome this problem, customized GPU kernels for parameter learning and marginal query computation (i.e., Process 3) based on Juice.jl, an open-source Julia package, may be implemented. The kernels automatically segment PC units into layers such that the computation in every layer can be fully parallelized. As a result, PCs can be trained with millions of parameters in less than an hour and samples may be en- or decoded very efficiently. Implementation details are discussed further below.

TABLE 3

Compression performance of PCs on MNIST, FashionMNIST, and EMNIST in bits-per-dimension (bpd). For all neural compression methods, numbers in parentheses represent the corresponding theoretical bpd (i.e., models' test-set likelihood in bpd).

| Dataset | HCLT (ours) | IDF | BitSwap | BB-ANS | JPEG2000 | WebP | McBits |
|---|---|---|---|---|---|---|---|
| MNIST | 1.24 (1.20) | 1.96 (1.90) | 1.31 (1.27) | 1.42 (1.39) | 3.37 | 2.09 | (1.98) |
| FashionMNIST | 3.37 (3.34) | 3.50 (3,47) | 3.35 (3.28) | 3.69 (3,66) | 3.93 | 4.62 | (3.72) |
| EMNIST (Letter) | 1.84 (1.80) | 2.02 (1.95) | 1.90 (1.84) | 2.29 (2.26) | 3.62 | 3.31 | (3.12) |
| EMNIST (ByClass) | 1.89 (1.85) | 2.04 (1.98) | 1.91 (1.87) | 2.24 (2.23) | 3.61 | 3.34 | (3.14) |

Empirical Evaluation

Bringing together expressive PCs (i.e., HCLTs) and the present (de)compressors, the compression performance of the proposed PC-based processes is evaluated further below. A comparison with 5 competitive lossless compression processes: JPEG2000; WebP; IDF, a Flow-based lossless compression process; BitSwap, BB-ANS, and McBits, three VAE-based lossless compression methods. All 6 methods were tested on 4 datasets, which include MNIST, FashionMNIST, and two splits of EMNIST. As shown in Table 3 (reproduced above), the present methods out-performed all 5 baselines in 3 out of 4 datasets. On FashionMNIST, where the present approach did not achieve state-of-the-art result, it was only 0.02 bpd worse than BitSwap.

Although specific processes for constructing HCLT PCs are discussed above with respect to FIGS. 3A-D, any of a variety of HCLT PCs and given various datasets as appropriate to the requirements of a specific application may be utilized in accordance with embodiments of the invention. PCs as expressive prior distributions of flow models in accordance with embodiments of the invention are discussed further below.

PCS as Expressive Prior Distributions of Flow Models

As hinted by previous sections, PCs can be naturally integrated with existing neural compression processes: the simple latent variables distributions used by Flow- and VAE-based lossless compression methods can be replaced by more expressive distributions represented by PCs. In this section, IDF, a Flow-based lossless compression model, will be utilized as an example to demonstrate the effectiveness of such model integration. IDF was chosen because its authors provided an open-source implementation on GitHub. The use of IDF is only exemplary and PC may be integrated with various compression models including, but not limited to, any VAE- and Flow-based model.

TABLE 4

Theoretical bpd of 5 Flow-based generative models on three natural image datasets.

| Model | CIFAR10 | ImageNet32 | ImageNet64 |
|---|---|---|---|
| RealNVP | 3.49 | 4.28 | 3.98 |
| Glow | 3.35 | 4.09 | 3.81 |
| IDF | 3.32 | 4.15 | 3.90 |
| IDF++ | 3.24 | 4.10 | 3.81 |
| PC + IDF | 3.28 | 3.99 | 3.71 |

Figure 4:
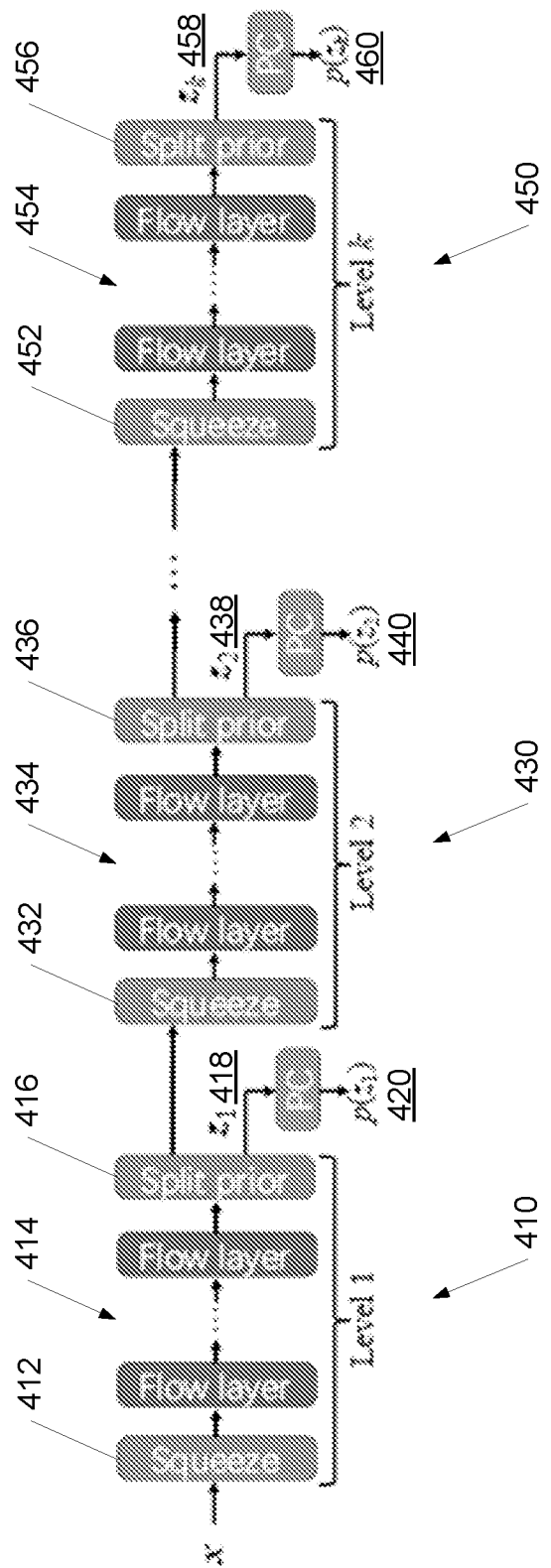
FIG. 4 is a diagram illustrating using PCs as prior distributions of an integer discrete flow (IDF) model in accordance with an embodiment of the invention.

A diagram illustrating using PCs as prior distributions of an integer discrete flow (IDF) model in accordance with an embodiment of the invention is shown in FIG. 4. As further described below, PCs may be used to represent the k sets of latent variables $\{z_i\}_{i=1}^{k}$. Specifically, an integrated model 400 is illustrated where an IDF model may contain k levels. Each level (e.g., Level 1 410, Level 2 430 ... Level k 450) contains a squeeze layer 412, 432, 452, followed by several integer flow layers 414, 434, 454 and a prior layer 416, 436, 456. Each level i outputs a set of latent variables $z_i$ 418, 438, 458, which are originally defined as a set of mutually independent discretized logistic variables. Instead, the present embodiments proposed to model every set of latent variables $z_i$ 418, 438, 458 with a PC $p(z_i)$ 420, 440, 460, respectively. Specifically, the EiNet codebase may be adopted and a PC structure may be utilized. The discretized logistic distribution for all leaf units in the PCs may be adopted. Given a sample x, the log-likelihood of the model is the sum of the k PCs' output log-likelihood: log $p(x)=\Sigma_{i=1}^{k}$ log log $p(z_i|x)$. Since both IDF and the PC models are fully differentiable, the PC+IDF model can be trained end-to-end via gradient descent. Details regarding model architecture and parameter learning are discussed further below.

The generative performance of the proposed PC+IDF model on 3 natural image datasets were evaluated: CIFAR10, ImageNet32, and ImageNet64. Results are shown in Table 4 (reproduced above). First, compared to 4 baselines (i.e., IDF, IDF++, Glow, and RealNVP) PC+IDF achieved the best bpd on ImageNet32 and ImageNet64.

Next, PC+IDF improved over its base model IDF by 0.04, 0.16, and 0.19 bpd on three datasets, respectively. This shows the benefit of integrating PCs with IDFs. In various embodiments, the performance could be further improved by integrating PCs with better Flow models (e.g., IDF++).

Compression and decompression with the PC+IDF model may be done easily. In many embodiments, the high-level compression process of IDF and replace the parts of en- or decoding latent variables $z_i$ with the proposed PC (de) compressor may be adopted. The compression performance of these hybrid models may be improved utilizing the present embodiments. Note that Thin. 1 applies to the PC component, and the compression time still depends linearly on the size of the neural network.

Although specific PCs as prior distributions of an IDF model are discussed above with respect to FIG. 4, any of a variety of PCs and compression models as appropriate to the requirements of a specific application may be utilized in accordance with embodiments of the invention. Process details and proofs in accordance with embodiments of the invention are discussed further below.

Process Details and Proofs

Additional details about the process used to compute the conditional probabilities $F_\pi(x)$ (i.e., Process 1) and the full proof of the theorems stated above are provided below.

Details of Process 1

This section provides additional technical details of Process 1. Specifically, (i) how to select the set of PC units $eval_i$(cf. Process 1 line 5) and (ii) how to compute $p(x_1, \ldots, x_i)$ as a weighted mixture of $P_i$(cf. Process 1 line 7) are demonstrated. Using the example in FIG. 5, an intuitive illustration to both problems is provided. As an extension to Process 1, rigorous and executable pseudocode for the present process can be found in Processes 2 and 3.

Figure 5A:
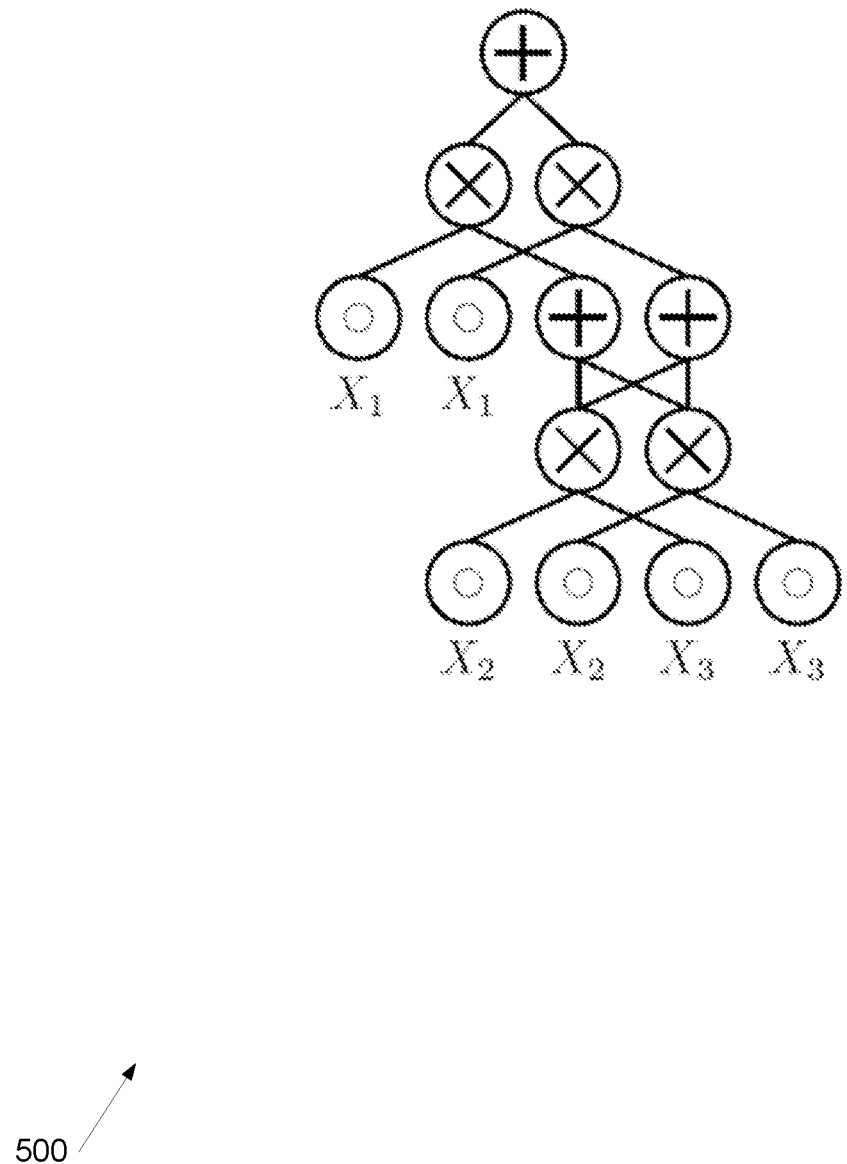
FIGS. 5A-C are diagrams illustrating impact of variable orders in computational efficiency of $F_\pi(x)$ in accordance with an embodiment of the invention.
Figure 5B:
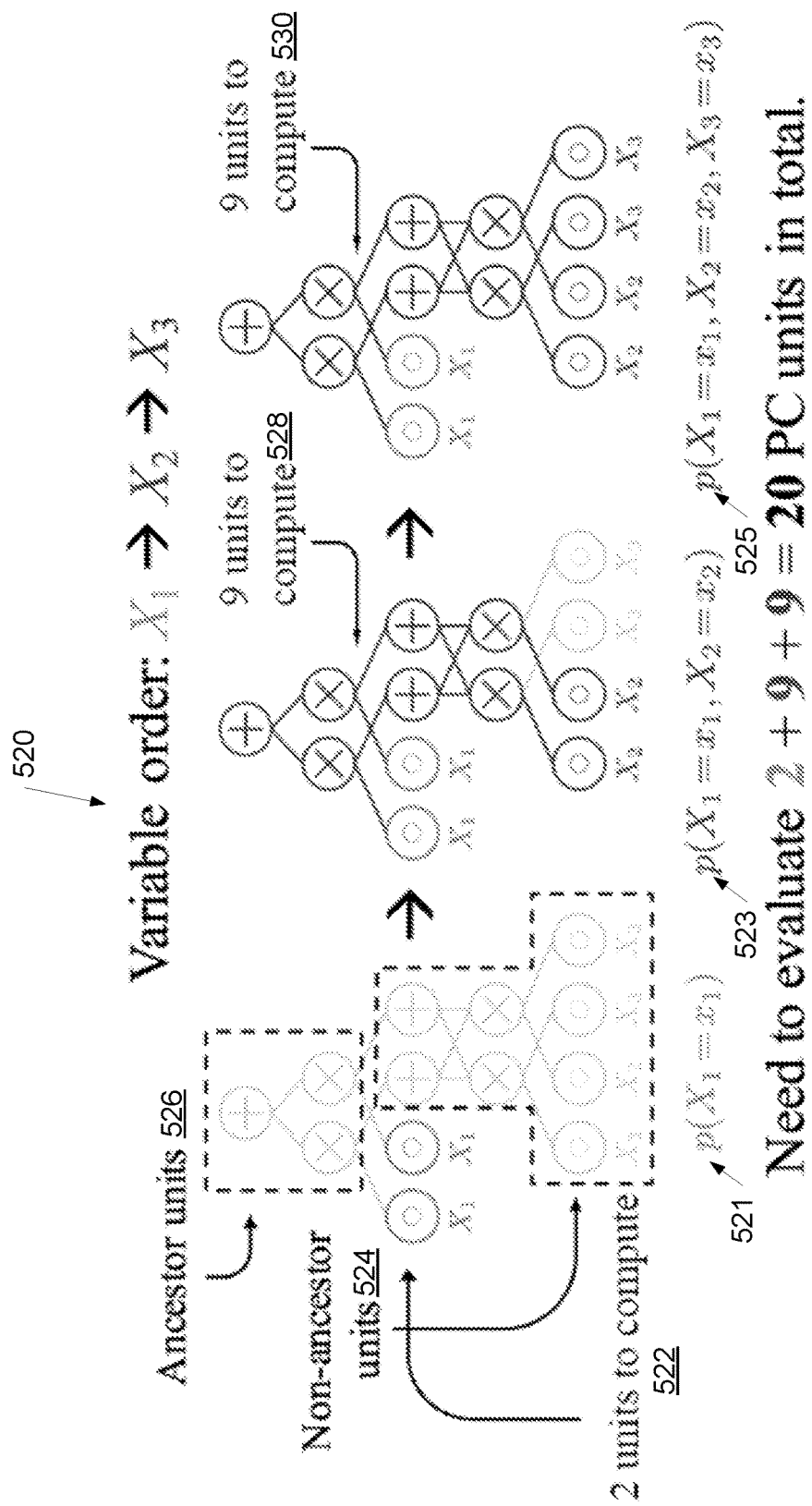
Figure 5C:
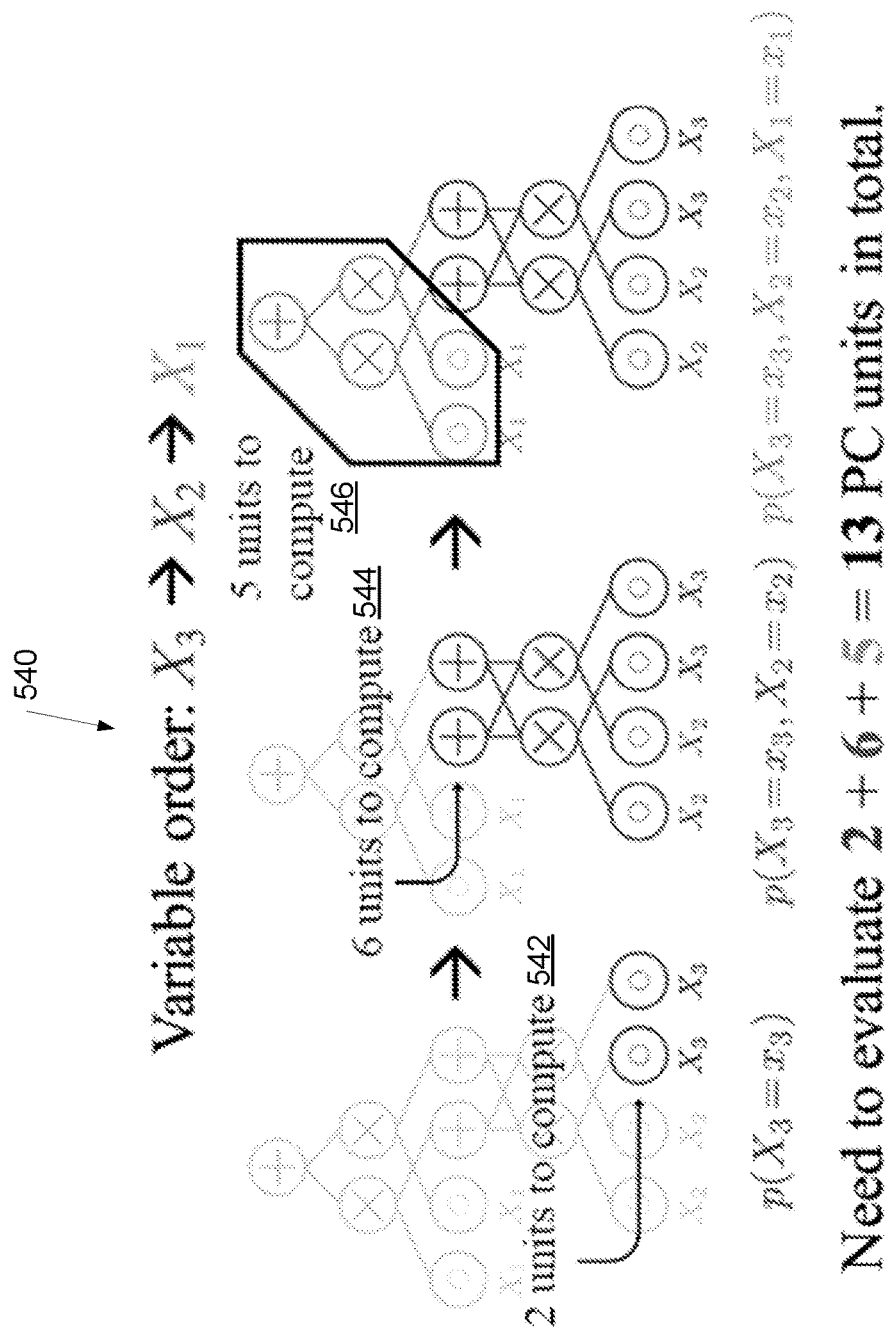

The key to speeding up the naive marginalization method is the observation that we only need to evaluate a small fraction of PC units to compute each of the D marginals in $F_\pi(x)$. Diagrams illustrating impact of variable orders in computational efficiency of $F_\pi(x)$ in accordance with an embodiment of the invention are shown in FIGS. 5A-C. Suppose one wants to compute F. (x) given the structured-decomposable PC 500 shown in FIG. 5(a), where ⊕, ⊗, and ⊙ denote sum, product, and input units, respectively. Model parameters are omitted for simplicity. Consider using the variable order $\pi=(X_1, X_2, X_3)$ 520 (as illustrated in FIG. 5(b)). The following question may be asked: what is the minimum set of PC units that need to be evaluated in order to compute $p(X_1=x_1)$ 521 (the first term in $F_\pi(x)$)? First, every PC unit with scope $\{X_1\}$(i.e., the two units to compute 522) should be evaluated. Next, every PC unit n that is not an ancestor of the two blue units (i.e., "non-ancestor units" 524 in FIG. 5(b)) must have probability 1 since (i) leaf units correspond to $X_2$ and $X_3$ have probability 1 while computing $p(X_1=x_1)$, and (ii) for any sum or product unit, if all its children have probability 1, it also has probability 1 following Eq. (2). Therefore, one does not need to evaluate these non-ancestor units. Another way to identify these non-ancestor units 524 is by inspecting their variable scopes—if the variable scope of a PC unit n does not contain $X_1$, it must has probability 1 while computing $p(X_1=x_1)$. Finally, following all ancestors of the two blue units (i.e., "ancestor units" 526 in FIG. 5(b)), the probability of the root unit, which is the target quantity $p(X_1=x_1)$ may be computed. At a first glance, this seems to suggest the need to evaluate these ancestor units explicitly. Fortunately, as further described below, the root unit's probability can be equivalently computed using the blue units' probabilities weighted by a set of cached top-down probabilities.

For ease of presentation, denote the two input units to compute 522 as $n_1$ and $n_2$, respectively. A key observation is that the probability of every ancestor unit of $\{n_1, n_2\}$ (including the root unit) can be represented as a weighted mixture over $pn_1(x)$ and $pn_2(x)$, the probabilities assigned to $n_1$ and $n_2$, respectively. The reason is that for each decomposable product node m, only distributions defined on disjoint variables shall be multiplied. Since $n_1$ and $n_2$ have the same variable scope, their distributions will not be multiplied by any product node. Following the above intuition, the top-down probability $p_{down}(n)$ of PC unit n is designed to represent the "weight" of n w.r.t. the probability of the root unit. Formally, $p_{down}(n)$ is defined as the sum of the probabilities of every path from n to the root unit $n_r$, where the probability of a path is the product of all edge parameters traversed by it. Back to our example, using the top-down probabilities, $p(X_1=x_1)=\Sigma_{i=1}^{2} p_{down}(n_i) \cdot p_{ni}(x_1)$ can be computed without explicitly evaluating the ancestors of $n_1$ and $n_2$. The quantity $p_{down}(n)$ of all PC units n can be computed by Process 2 in $\mathcal{O}(|p|)$ time. Specifically, the method performs a top-down traversal over all PC units n, and updates the top-down probabilities of their children in(n) along the process.

Therefore, one may only need to compute the two PC units with scope $\{X_1\}$ in order to calculate $p(X_1=x_1)$. Next, when computing the second term $p(X_1=x_1, X_2=x_2)$ 523, as illustrated in FIG. 5(b), the evaluated probabilities of $n_1$ and $n_2$ may be reused, and similarly may only need to evaluate the PC units with scope $\{X_2\}$, $\{X_2, X_3\}$, or $\{X_1, X_2, X_3\}$ (i.e., the 9 units to compute 528). The same scheme can be used when computing the third term 525, and only PC units with scope $\{X_3\}$, $\{X_2, X_3\}$, or $\{X_1, X_2, X_3\}$ (i.e., the 9 units to compute 530) may be evaluated. As a result, only 20 PC units in total may be evaluated, compared to $3 \cdot |p|=39$ units required by the naive approach.

This procedure is formalized in Process 3, which adds additional technical details compared to Process 1. In the main loop (lines 5-9), the D terms in $F_\pi(x)$ are computed one-by-one. While computing each term, the PC units that need to be evaluated (line 6) may first be found. After computing their probabilities in a bottom-up manner (line 7), one may additionally use the pre-computed top-down probabilities to obtain the target marginal probability (lines 8-9).

The previous example demonstrates that even without a careful choice of variable order, one can significantly lower the computation cost by only evaluating the necessary PC units. As further described below, with an optimal choice of variable order (denoted $\pi^*$), the cost can be further reduced. For example, consider using order $\pi^*=(X_3, X_2, X_1)$ 540, as shown in FIG. 5(c), one only needs to evaluate the 2 units to compute 542, 6 units to compute 544, and 5 units to compute 546 totaling 2+6+5=13 PC units when running Process 3. This optimal variable order may be a key to guaranteeing $\mathcal{O}(\log(D) \cdot |p|)$ computation time. In the following, a technical assumption is first given and then a justification of the correctness and efficiency of Process 3 when using the optimal variable order $\pi^*$ is provided.

Proof of Theorem 1

As hinted by the proof sketch provided above, this proof may comprise three main parts—(i) construction of the optimal variable order $\pi^*$ given a smooth and structured-decomposable PC, (ii) justification of the correctness of Process 3, and (iii) proof that $F_{\pi^*}(x)$ can be computed by evaluating no more than $\mathcal{O}(\log(K) \cdot |p|)$ PC units (i.e., analyze the time complexity of Process 3).

Figure 6:
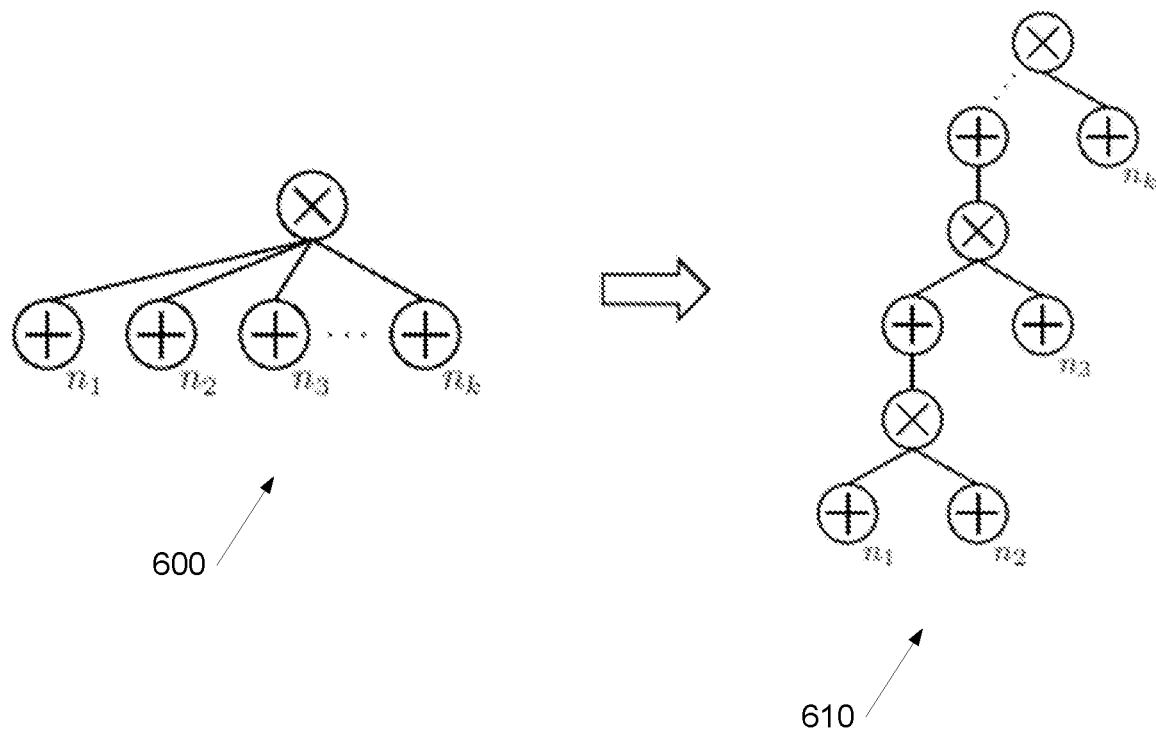
FIG. 6 is a diagram illustrating converting a product unit with k children into an equivalent PC in accordance with an embodiment of the invention.

Construction of an optimal variable order For ease of illustration, the original smooth and structured-decomposable PC may first be transformed into an equivalent PC where every product node has two children. A diagram illustrating converting a product unit 600 with k children into an equivalent PC 610 in accordance with an embodiment of the invention is shown in FIG. 6. FIG. 6 illustrates this transformation on any product node with more than two children. Note that this operation will not change the number of parameters in a PC, and will only incur at most $2 \cdot |p|$ edges.

The variable tree (vtree) of a smooth and structured-decomposable PC may now be defined. Specifically, a vtree is a binary tree structure whose leaf nodes are labeled with a PC's input features/variables X (every leaf node is labeled with one variable). A PC conforms to a vtree if for every product unit n, there is a corresponding vtree node v such that children of n split the variable scope $\varphi(n)$ in the same way as the children of the vtree node v. According to its definition, every smooth and structured-decomposable PC whose product units all have two children must conform to a vtree. Diagrams illustrating a structured-decomposable PC, vtrees, and a converted PC equivalent in accordance with an embodiment of the invention are shown in FIGS. 7A-D. For example, the PC 700 shown in FIG. 7(a) conforms to the vtree 710 illustrated in FIG. 7(b). Similar to PCs, we define the scope $\varphi(v)$ of a vtree node v as the set of all descendent leaf variables of v.

One may say that a unit n in a smooth and structured-decomposable PC conforms to a node v in the PC's corresponding vtree if their scopes are identical. For ease of presentation, define $\phi(p, v)$ as the set of PC units that conform to vtree node v. Additionally, one may define $\phi_{sum}(p, v)$ and $\phi_{prod}(p, v)$ as the set of sum and product units in $\phi(p, v)$, respectively.

---

Process 2 PC Top-down Probabilities

1: Input: A smooth and structured-decomposabk: PC p
2: Output: The top-down probabilities $p_{down}(n)$ of all PC units n:
3: For every PC unit n in p, initialize $P_{down}(n) \leftarrow 0$
4: foreach unit n traversed in preorder (parent before children) do
5: | If a is the root node of p then $p_{down}(2) \leftarrow 1$
6: | elif n is a sum unit then foreach c ∈ in(n) do prowa(0) + $p_{down}(c) + p_{down}(n) \cdot \theta_{n,c}$
7: | elif n is a product unit then foreach c ∈ in(n) do $p_{down}(c) + p_{down}(c) + p_{down}(10)$ ---
Process 3 Compute $F_\pi(x)$
---

1: Input: A smooth and structured-decomposable PC p, variable order $\pi$, variable instantiation x
2: Output: $F_\pi(x) = \{p(x_{\pi 1}, \ldots, x_{\pi i})\}_{i=1}^D$
3: Initialize: The probability p(n) of every unit n is initially set to 1
4: $p_{down}$ ← the top-down probability of every PC unit n (i.e., Process 2)
5: for i = 1 to D do # Compute the ith term in $F_\pi(x)$: $p(x_{\pi 1}, \ldots, x_{\pi i})$
6: $\text{leval}_i$ ← the set of PC units n with scopes $\varphi(n)$ that satisfy at least one of the following conditions:
 |(i) $\varphi(n) = \{X_{\pi_x}\}$; (ii) n is a sum unit and at least one child c of n needs evaluation, i.e., c∈eval$_i$;
 |(iii) n is a product unit and $X_{\pi=l}$, $e\varphi(n)$ and $\beta c \in in(n)$ such that $\{x_{\pi j}\}_{j=1}^i \in \varphi(c)$
7: |Evaluate PC units in eval$_i$ in a bottom-up manner to compute $\{p_n(x) : n \in \text{eval}_i\}$
8: |head$_i$ ← the set of PC units in eval$_i$ such that none of their parents are in eval$_i$
9: $lp(x_{n_i}, \ldots, x_{n_i}) \leftarrow \Sigma_n \in \text{head}_i \, p_{down}(n) \cdot p_n(x)$

---

Figure 7:
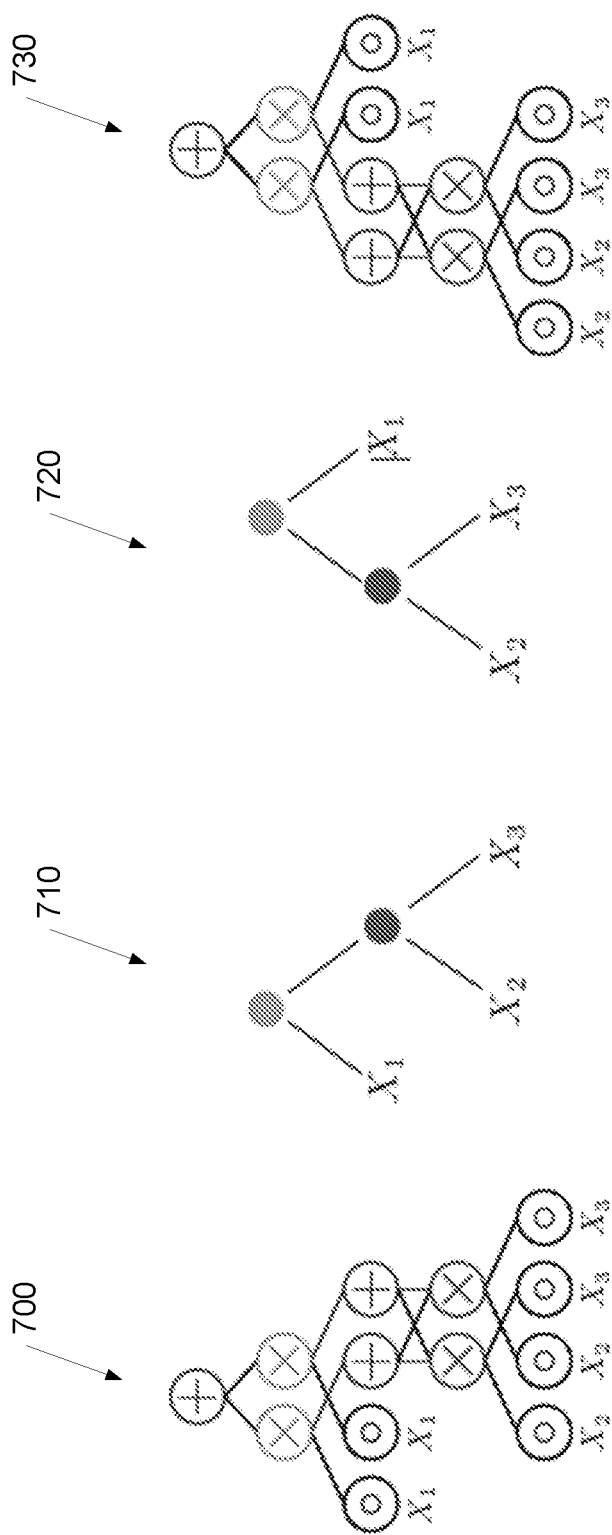
FIGS. 7A-D are diagrams illustrating a structured-decomposable PC, vtrees, and a converted PC equivalent in accordance with an embodiment of the invention.

Next, an operation that changes a vtree into an ordered vtree may be defined, where for each inner node v, its left child has more descendent leaf nodes than its right child. See FIG. 7(c-d) as an example. The vtree 710 in FIG. 7(b) is transformed into an ordered vtree 720 illustrated in FIG. 7(c); the corresponding PC 700 (see FIG. 7(a)) is converted into an ordered PC 730 (see FIG. 7(d)). This transformation can be performed by all smooth and structured-decomposable PCs.

Next, the optimal variable order may be defined. For a pair of ordered PC and ordered vtree, the optimal variable order $\pi^*$ is defined as the order the leaf vtree nodes (each corresponds to a variable) are accessed following an inorder traverse of the vtree (left child accessed before right child).

Correctness of Process 3 Assume we have access to a smooth, structured-decomposable, and ordered PC p and its corresponding vtree. Recall from the above construction, the optimal variable order $\pi^*$ is the order following an inorder traverse of the vtree.

It may be shown that it is sufficient to only evaluate the set of PC units stated in line 6 of Process 3. Using the new definition of vtrees, line 6 in the following equivalent way may be stated. At iteration i (i.e., we want to compute the ith term in $F_\pi(x)$: $p(x_{\pi 1}, \ldots, x_{\pi i})$), one needs to evaluate all PC units that conform to any vtree node in the set $T_{p,i}$. Here $T_{p,i}$ is defined as the set of vtree nodes v that satisfy the following condition: $X_{\pi i} \in \varphi(v)$ and there does not exist a child c of v such that $\{x_{\pi j}\}_{j=1}^i \in \varphi(c)$. For ease of presentation, the present embodiments refers to evaluate PC units $\phi(p, v)$ when it is said "evaluate a vtree node v".

First, one does not need to evaluate vtree units v where $X_{\pi i} \notin \varphi(v)$ because the probability of these PC units will be identical to that at iteration i−1 (i.e., when computing $p(x_{\pi 1}, \ldots, x_{\pi i-1})$). Therefore, one only needs to cache these probabilities computed in previous iterations.

Second, one does not need to evaluate vtree units v where at least one of its children c satisfy $\{x_{\pi j}\}_{j=1}^{i-1} \in \varphi(c)$ because one can obtain the target marginal probability $p(x_{\pi 1}, \ldots, x_{\pi i})$ following lines 7-9 of Process 3. How this is done in the following is provided directly below.

Denote the "highest" in $T_{p,i}$ as $v_{r,i}$ (i.e., the parent of $v_{r,i}$ is not in $T_{p,i}$). According to the variable order $\pi^*$, $v_{r,i}$ uniquely exist for any $i \in [D]$. According to Process 2, the top-down probabilities of PC units is defined as follows $p_{down}(n_r) = 1$, where $n_r$ is the PC's root unit.

For any product unit n, $p_{down}(n) = \Sigma_{m \in par(n)} p_{down}(m) \cdot \theta_{m,n}$, where par(n) is the set of parent (sum) units of n.

For any sum unit n, $p_{down}(n) = \Sigma_{m \in par(n)} p_{down}(m)$, where par(n) is the set of parent (product) units of n.

It may now be proved that $$p(x_{\pi_1}, \ldots, x_{\pi_i}) = \sum_{n \in \varphi_{sum}(p,v)} p_{down}(n) \cdot p_n(x) \quad (3)$$

holds when $v = v_{r,i}$.

Base case: If v is the vtree node correspond to $n_r$, then $\phi sum(p, v) = n_r$ and it is easy to verify that $$p(x_{\pi_1}, \ldots, x_{\pi_i}) = p_{down}(n_r) \cdot p_{n_r}(x) = \sum_{n \in \varphi_{sum}(p,v)} p_{down}(n) \cdot p_n(x)$$

Inductive case: Suppose v is an ancestor of $v_{r,i}$ and the parent vtree node $v_p$ of v satisfy Eq. (3). We have $$p(x_{\pi_1}, \ldots, x_{\pi_i}) = \sum_{m \in \varphi_{sum}(p,v_p)} p_{down}(m) \cdot p_m(x)$$

$$= \sum_{m \in \varphi_{sum}(p,v_p)} \sum_{n \in in(m)} p_{down}(m) \cdot \theta_{m,n} \cdot p_n(x)$$

$$\stackrel{(a)}{=} \sum_{n \in \varphi_{prod}(p,v_p)} \underbrace{\sum_{m \in par(n)} p_{down}(m) \cdot \theta_{m,n}}_{p_{down}(n)} \cdot p_n(x)$$

$$= \sum_{n \in \varphi_{prod}(p,v_p)} p_{down}(n) \cdot p_n(x)$$

$$\stackrel{(b)}{=} \sum_{n \in \varphi_{prod}(p,v_p)} \sum_{o \in \{o : o \in in(n), \{X_j\}_{j=1}^i \in \phi(o)\}} p_{down}(n) \cdot p_o(x)$$

$$\stackrel{(c)}{=} \sum_{o \in \varphi_{sum}(p,v)} \underbrace{\sum_{n \in par(o)} p_{down}(n)}_{p_{down}(o)} \cdot p_o(x)$$

$$= \sum_{o \in \varphi_{sum}(p,v)} p_{down}(o) \cdot p_o(x)$$

where (a) reorders the terms for summation; (b) holds since $\forall n \in \phi_{prod}(p, v_p)$, $p_n(x) = \Pi_{o \in in(n)} p_o(x)$ and $\in in(n)$ and $\forall_o \in in(n)$ such that $\{X_j\}_{j=1}^i \cap \varphi(o) = \emptyset$, $p_o(x) = 1;8(c)$ holds because $$\bigcup_{n \in \varphi_{prod}(p,v_p)} \{o : o \in in(n), \{X_j\}_{j=1}^i \in \phi(o)\} = \varphi_{sum}(p, v).$$

Thus, it has been proved that Eq. (3) holds for $v = v_{r,i}$, and hence the probability $p(x_{\pi 1}, \ldots, x_{\pi i})$ can be computed by weighting the probability of PC units $\phi_{sum}(p, v_{r,i})$ (line 8 in Process 3) with the corresponding top-down probabilities (line 9 in Process 3).

Efficiency of following the optimal variable order It may be shown that when using the optimal variable order $\pi^*$, Process 3 evaluates no more than $\mathcal{O}(\log(D)\cdot|p|)$ PC units.

According to the previous paragraphs, whenever Process 3 evaluates a PC unit n w.r.t. vtree node v, it will evaluate all PC units in $\phi(p, v)$. Therefore, one may instead count the total number of vtree nodes needed to be evaluated by Process 3. Since the PC is assumed to be balanced Def. 4, for every v, it follows $\phi(p, v) = \mathcal{O}(|p|/D)$. Therefore, one only needs to show that Process 3 evaluates $\mathcal{O}(D \cdot \log(D))$ vtree nodes in total.

One may start with the base case, which is PCs correspond to a single vtree leaf node v. In this case, $F_{\pi^*}(x)$ boils down to computing a single marginal probability $p(x\pi 1)$, which needs to evaluate PC units $\phi(p, v)$ once.

Define $f(x)$ as the number of vtree nodes need to be evaluated given a PC corresponds to a vtree node with x descendent leaf nodes. From the base case, one knows that $f(1)=1$.

Next, consider the inductive case where v is an inner node that has x descendent leaf nodes. Define the left and right child node of v as $c_1$ and $c_2$, respectively. Let $c_1$ and $c_2$ have y and z descendent leaf nodes, respectively. One may want to compute $F_{\pi^*}(x)$, which can be broken down into computing two following sets of marginals:

$$\{p(x_{\pi_1^*}, \ldots x_{\pi_i^*})\}_{i=1}^{y} \quad \text{Set 1}$$

$$\{p(x_{\pi_1^*}, \ldots, x_{\pi_i^*})\}_{i=y+1}^{y+z} \quad \text{Set 2}$$

Since $\pi^*$ follows the in-order traverse of v, to compute the first term, one only needs to evaluate $c_1$ and its descendents, that is, one needs to evaluate $f(y)$ vtree nodes. This is because the marginal probabilities in set 1 are only defined on variables in $\phi(c_1)$. To compute the second term, in addition to evaluating PC units corresponding to $c_2$ (that is $f(z)$ vtree nodes in total), one also needs to re-evaluate the PC units $\phi(p, v)$ every time, which means one needs to evaluate z more vtree nodes. In summary, the following may be evaluated $$f(x) = f(y) + f(z) + z \, (y \geq z, y+z=x)$$

vtree nodes.

To complete the proof, one may upper bound the number of vtree nodes needed to be evaluated. Define $g(\cdot)$ as follows:

$$g(x) = \max_{y \in \{1, \ldots, \lfloor \frac{x}{2} \rfloor\}} y + g(y) + g(x-y).$$

It is not hard to verify that $\forall x \in Z, g(x) \geq f(x)$. Next, it may be proven that, $$\cdot x \in \mathbb{Z}(x \geq 2), g(x) \leq 3x \log x.$$

First, we can directly verify that $g(2) \leq 3 \cdot 2 \log_2 2 \approx 4.1$. Next, for $x \geq 3$, $$g(x) = \max_{y \in \{1, \ldots, \lfloor \frac{x}{2} \rfloor\}} y + g(y) + g(x-y)$$

$$\leq \max_{y \in \{1, \ldots, \lfloor \frac{x}{2} \rfloor\}} \underbrace{y + 3y \log y + 3(x-y) \log(x-y)}_{h(y)}$$

$$\stackrel{(a)}{\leq} \max\left(1 + 3(x-1)\log(x-1), \left\lfloor \frac{x}{2} \right\rfloor + 3\left\lfloor \frac{x}{2} \right\rfloor \log \left\lfloor \frac{x}{2} \right\rfloor + 3\left(x - \left\lfloor \frac{x}{2} \right\rfloor\right) \log\left(x - \left\lfloor \frac{x}{2} \right\rfloor\right)\right),$$

$$\leq \max\left(1 + 3(x-1)\log(x-1), \left\lfloor \frac{x}{2} \right\rfloor + 3(x+1) \log \frac{x+1}{2}\right)$$

$$\leq 3x \log x$$

where (a) holds since according to its derivative, h(y) obtains its maximum value at either y=1 or $$y = \left\lfloor \frac{x}{2} \right\rfloor.$$

For a structured-decomposable PC with D variables, $g(D) \leq 3D \log D$ vtree nodes need to be evaluated. Since each vtree node corresponds to $$\mathcal{O}\left(\frac{|p|}{D}\right)$$

PC units, we need to evaluate $\mathcal{O}(\log(D)\cdot|p|)$ PC units to compute $F_{\pi^*}(x)$.

HCLTs, EiNets, and RAT-SPNs are Balanced

Consider the compilation from a PGM to an HCLT. It may be first noted that each PGM node g uniquely corresponds to a variable scope p of the PC. That is, all PC units correspond to g have the same variable scope. Details on how to generate a HCLT given its PGM representation are further described below.

In the main loop of Process 4 (lines 5-10), for each PGM node g such that $\text{var}(g) \in Z$, the number of computed PC units are the same (M product units compiled in line 9 and M sum units compiled in line 10). Therefore, for any variable scopes $\varphi_1$ and $\varphi_2$ possessed by some PC units, one has $|\text{nodes}(p, \varphi(m))| \approx |\text{nodes}(p, \varphi(n))|$. Since there are in total $\Theta(D)$ different variable scopes in p, it may follow: for any scope $\varphi'$ exists in an HCLT p, nodes $(p, \varphi') = \mathcal{O}(|p|/D)$.

EiNets and RAT-SPNs are also balanced since they also have an equivalent PGM representation of their PCs. The main difference between these models and HCLTs is the different variable splitting strategy in the product units.

Although specific impacts of variable orders, conversion of product units into equivalent Pcs, structured-decomposable PCs, vtress, and conversion of PC equivalents are discussed above with respect to FIGS. 5A-7D, any of a variety of variable orders, conversion of product units into equivalent Pcs, structured-decomposable PCs, vtress, and conversion of PC equivalents as appropriate to the requirements of a specific application may be utilized in accordance with embodiments of the invention. Methods and experiment details in accordance with embodiments of the invention are discussed further below.

Methods and Experiment Details

Learning HCLTs

Computing Mutual Information As mentioned above, computing the pairwise mutual information between variables X is the first step to compute the Chow-Liu Tree. Since the exemplary conditions are dealing with categorical data (e.g., 0-255 for pixels), one may compute mutual information by following its definition:

$$I(X;Y) = \sum_{i=1}^{C_X}\sum_{j=1}^{C_Y} P(X=i, Y=j) \log_2 \frac{P(X=i, Y=j)}{P(X=i)P(Y=j)},$$

where $C_X$ and $C_Y$ are the number of categories for variables X and Y, respectively. To lower the computation cost, for image data, one may truncate the data by only using 3 most-significant bits. That is, one may treat the variables as categorical variables with $2^3=8$ categories during the construction of the CLT. Note that the full data when constructing/learning the PC is used.

Training pipeline Two types of EM updates may be adopted—mini-batch and full-batch. In mini-batch EM, parameters are updated according to a step size $\eta$: $\theta^{(k+1)} \leftarrow (1-\eta)\,\theta^{(k)} + \eta\theta^{(new)}$, where $\theta^{(new)}$ is the EM target computed with a batch of samples; full-batch EM updates the parameters by the EM target computed using the whole dataset. As described herein, HCLTs is trained by first running mini-batch EM with batch size 1024 and $\eta$ changing linearly from 0.1 to 0.05; full-batch EM is then used to finetune the parameters.

---

Process 4 Compile the POM representation of a HCLT into an equivalent PC

---

1: Input: A PGM representation of a HCLT G (e.g., Fig. 3(c)); hyperparameter M/
2: Output: A smooth and structured-decomposable PC p equivalent to G
3: Initialize: cache ← dict( ) a dictionary storing intermediate PC units
4: Sub-routines: PC leaf( $X_i$) returns a PC inpot unit of variable $X_i$; PC_prod($\{n_i\}_{i=1}^m$). (resp. PC_sum( $\{n_i\}_{i=1}^m$)) returns a product (resp. sum) unit over child nodes $\{n_i\}_{i=1}^m$.
5: foreach node g traversed in postorder (bottom-up) of G do
6: | If var(g) = X then cache[g] <- [PC leaf(var(g) for i = 1 : M]
7: | else # That is, var(g) ∈ Z
8: | | chs cache ← [cache[e] for c in children(g)] # children(g) is the set of children of g
9: | | prod_nodes IPC_prod (nodes[] for nodes in che cache) for 1 = 1 : M]
10: ⌊⌊ cache[g] + [PC_sum (prod_nodes) for t = 1 : M]
11: return cache[root(G)] [0]

---

Generating PCs Following the HCLT Structure

After generating the PGM representation of a HCLT model, one may now be left with the final step of compiling the PGM representation of the model into an equivalent PC. Recall that one may define the latent variables $\{Z_i\}_{i=1}^4$ as categorical variables with M categories, where M is a hyperparameter. As demonstrated in Process 4, one may incrementally compile every PGM node into an equivalent PC unit though a bottom-up traverse (line 5) of the PGM. Specifically, leaf PGM nodes corresponding to observed variables $X_i$ may be compiled into PC input units of $X_i$ (line 6), and inner PGM nodes corresponding to latent variables are compiled by taking products and sums (implemented by product and sum units) of its child nodes' PC units (lines 8-10). Leaf units generated by PC leaf (X) can be any simple univariate distribution of X. Categorical leaf units in the HCLT experiments may be used. FIG. 3(d) demonstrates the result PC after running Process 4 with the PGM in FIG. 3(c) and M=2.

Implementation Details of the PC Learning Process

The present embodiments adopted the EM parameter learning method which computes the EM update targets using expected flows. Further, the present embodiments may use a hybrid EM method, which uses mini-batch EM updates to initiate the training process, and switch to full-batch EM updates afterwards.

Mini-batch EM: denote $\theta^{(EM)}$ as the EM update target computed with a mini-batch of samples. An update with step-size $\eta$ is: $\theta^{(k+1)} \leftarrow (1-\eta)\,\theta^{(k)} + \eta\theta^{(EM)}$.

Full-batch EM: denote $\theta^{(EM)}$ as the EM update target computed with the whole dataset. Full-batch EM updates the parameters with $\theta^{(EM)}$ at each iteration.

In our experiments, the HCLTs with 100 mini-batch EM epochs and 20 full-batch EM epochs were trained. During mini-batch EM updates, q was annealed linearly from 0.15 to 0.05.

Details of the Compression/Decompression Experiment

Hardware specifications All experiments may be performed on a server with 72 GPUs, 512G Memory, and 2 TITAN RTX GPUs. In all experiments, only a single GPU on the server was used.

IDF All experiments were run with the code in the GitHub repo provided by the authors. We adopted an IDF model with the following hyperparameters: 8 flow layers per level; 2 levels; densenets with depth 6 and 512 channels; base learning rate 0.001; learning rate decay 0.999. The process adopts an CPU-based entropy coder rANS. For (de)compression, the following script may be used:
https://github.com/jornpeters/integer_discrete_flows/blob/master/experiment coding.py.

BitSwap All models were trained using the following author-provided script:
https://github.com/fhkingma/bitswap/blob/master/model/mnist_trai n.py. The method adopts an CPU-based entropy coder rANS. And the following code for (de)compression may be used:
https://github.com/fhkingma/bitswap/blob/master/mnist compress.p y.

BB-ANS All experiments may be performed using the following official code:
https://github.com/bits-back/bits-back.

Details of the PC+IDF Model

The adopted IDF architecture follows the original paper by Hoogeboom et al. For the PCs, we adopted EiNets with hyperparameters K=12 and R=4. Instead of using random binary trees to define the model architecture, we used binary trees where "closer" latent variables in z will be put closer in the binary tree.

Parameter learning was performed by the following steps. First, compute the average log-likelihood over a mini-batch of samples. The negative average log-likelihood is the loss we use. Second, compute the gradients w.r.t. all model parameters by backpropagating the loss. Finally, update the IDF and PCs using the gradients individually: for IDF the Adamax optimizer was used; for PCs, the gradients to compute the EM target of the parameters and performed mini-batch EM updates were used.

Example Apparatus for Performing Lossless Compression Using Pcs

Figure 8:
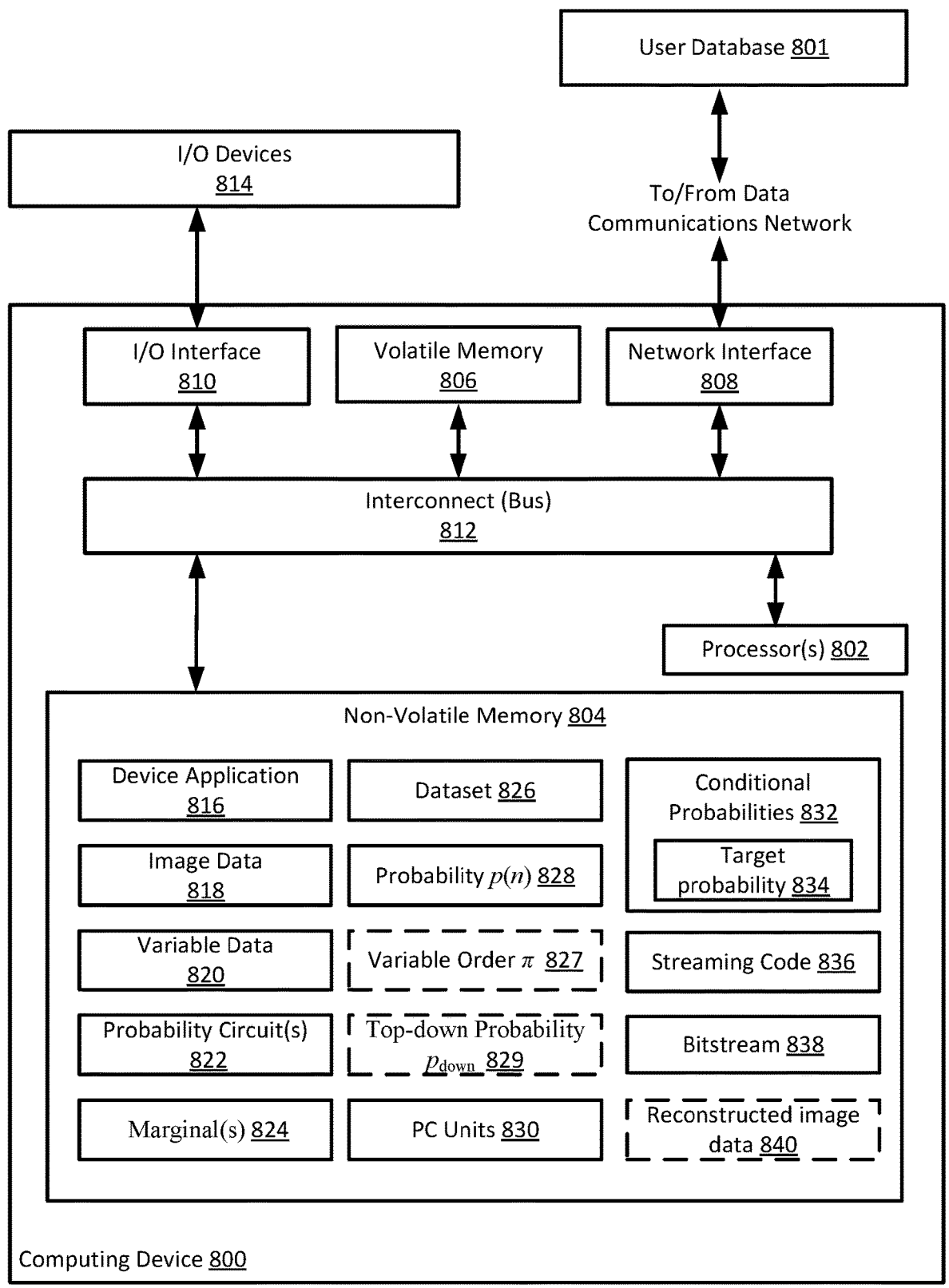
FIG. 8 is a block diagram depicting a computing device configured to perform lossless compression using PCs in accordance with an embodiment of the invention.

FIG. 8 is a block diagram depicting a computing device configured to perform lossless compression using PCs in accordance with an embodiment of the invention. Although depicted as a single physical device, in embodiments, computing device 800 may be implemented using virtual device(s), and/or across a number of devices, such as in a cloud environment. Computing device 800 may be an encoder, a decoder, a combination of encoder and decoder, a display device, a server, multiple serves, or any combination thereof.

As illustrated, computing device 800 includes a one or more processor(s) 802, non-volatile memory 804, volatile memory 806, a network interface 808, and one or more input/output (I/O) interfaces 810. In the illustrated embodiment, processor(s) 802 retrieves and executes programming instructions stored in the non-volatile memory 804 and/or the volatile memory 806, as well as stores and retrieves data residing in the non-volatile memory 804 and/or the volatile memory 806. In certain embodiments, non-volatile memory 804 is configured to store instructions (e.g., computer-executable code, device application 816) that when executed by processor(s) 802, cause processor(s) 802 to perform the processes and/or operations described herein and/or illustrated in the figures. In certain embodiments, non-volatile memory 804 stores code for executing the functions of an encoder and/or a decoder. Note that the computing device 800 may be configured to perform the functions of only one of the encoder or the decoder, in which case additional system(s) may be used for performing the functions of the other.

Processor(s) 802 is generally representative of a single central processing unit (CPU) and/or graphics processing unit (GPU), multiple CPUs and/or GPUs, a single CPU and/or GPU having multiple processing cores, and the like. Volatile memory 806 is generally included to be representative of a random access memory (RAM). Non-volatile memory 804 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices (such as keyboards, monitors, etc.) can be connected via the I/O interface(s) 810. Further, via network interface 808, computing device 800 can be communicatively coupled with one or more other devices and components, such as user database 801. In certain embodiments, computing device 800 is communicatively coupled with other devices via a network, which may include the Internet, local network(s), and the like. The network may include wired connections, wireless connections, or a combination of wired and wireless connections. As illustrated, processor(s) 802, non-volatile memory 804, volatile memory 806, network interface 808, and I/O interface(s) 810 are communicatively coupled by one or more bus interconnects 812. In certain embodiments, computing device 800 is a server executing in an on-premises data center or a cloud environment. In certain embodiments, the computing device 800 is a user's mobile device.

In the illustrated embodiment, the non-volatile memory 804 may include a device application 816 that configures the processor(s) 802 to perform various processes and/or operations in performing lossless compression using PCs, as described above. As described above, the computing device 800 may be configured to receive image data (e.g., image data 818) to be compressed. For example, the image data 818 may include a plurality of pixels and each pixel may be represented by variable data 820. In other examples, any data to be compressed may be represented by variable data 820. In some embodiments, the computing device 800 may also be configured to sequentially compress the variables one-by-one using conditional probabilities 832, as described herein. For example, in some embodiments, the conditional probabilities 832 may be computed by calculating at least one marginal 824 (e.g., F(x) and/or G(x)). Further, the computing device 800 may be configured to perform initialization steps such as, but not limited to, initially setting a probability p(n) 828 for every PC unit n 830 and defining an $eval_i$ for a set of PC units n 830 that need to be evaluated in an $i^{th}$ iteration, for i=1 to a dataset D 826, as further described above. Moreover, the computing device 800 may be configured to evaluate PC units n 830 in eval; using a bottom-up process and computing a target probability $p(x_1, \ldots, x_i)$ 834, as further described above. In addition, the computing device 800 may be configured to generate a bitstream 838 using various methods, including but not limited to, using a streaming code 836 using the conditional probabilities 832.

In further reference to FIG. 8, in some embodiments, the computing device 800 may be configured to perform decoding functions. For example, the computing device 800 may be configured to decode a bitstream 838 using probability circuits 822, conditional probabilities 832, streaming code 836 to reconstruct the original data (e.g., image data 818) as reconstructed image data 840.

Further, although specific operations and data are described as being performed and/or stored by a specific computing device above with respect to FIG. 8, in certain embodiments, a combination of computing devices may be utilized instead. In addition, various operations and data described herein by be performed and/or stored by the computing device 800. For example, the computing device 800 may be configured to variable order π 827 and top-down probabilities $p_{down}$ 829 in performing lossless compression using PCs as further described above.

Each of these non-limiting examples can stand on its own or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." In this document, the term "set" or "a set of" a particular item is used to refer to one or more than one of the particular item.

Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for lossless compression using probabilistic circuits (PCs), the method comprising:
   receiving image data comprising a plurality of pixels, wherein each of the plurality of pixels is represented by a variable;
   sequentially compressing the variables one-by-one using conditional probabilities, wherein the conditional probabilities are computed by:
   calculating at least one marginal;
   initially setting to 1 a probability p(n) for every PC unit n;
   defining an $eval_i$ for a set of PC units n that need to be evaluated in an $i^{th}$ iteration; and
   for i=1 to a dataset D, evaluating PC units n in $eval_i$ using a bottom-up process and computing a target probability; and
   generating a bitstream using a streaming code for the compressed variables using the conditional probabilities.

2. The method of claim 1, wherein sequentially compressing the variable one-by-one using the conditional probabilities comprises encoding a next variable by defining a left and right side cumulative probabilities of the next variable given one or more already encoded variables.

3. The method of claim 2, wherein the left and right side cumulative probabilities are defined using a 2D conditional probability that is a quotient of two marginals.

4. The method of claim 1, wherein calculating the at least one marginal comprises:
   inputting a PC p having a variable instantiation x;
   outputting a marginal $F(x)=\{p(x_1, \ldots, x_1)\}_{i=1}^{D}$, wherein D is the dataset.

5. The method of claim 4, wherein each of D terms in F(x) is computed one-by-one.

6. The method of claim 5, wherein each iteration on average re-evaluates only log(D)/D of the PC p.

7. The method of claim 1, wherein the evaluating the PC units in $eval_i$ is performed in a feedforward process to compute the target probability.

8. The method of claim 1, wherein at iteration i, a set of PC units $eval_i$ is selected that guarantees correctness of a target marginal, and contains a minimum number of PC units.

9. The method of claim 8, wherein the guarantee of correctness of the target marginal, and containing the minimum number of PC units is achieved by recognizing types of PC units that can be eliminated for evaluation.

10. The method of claim 9, wherein a root node's probability is equivalently computed using a weighted mixture of probabilities of PC units in $eval_i$.

11. A non-transitory computer readable storage medium storing a program comprising instructions that, when executed by at least one processor of a computing device, cause the at least one processor to perform operations including:
   receiving image data comprising a plurality of pixels, wherein each of the plurality of pixels is represented by a variable;
   sequentially compressing the variables one-by-one using conditional probabilities, wherein the conditional probabilities are computed by:
   calculating at least one marginal;
   initially setting to 1 a probability p(n) for every PC unit n;
   defining an $eval_i$ for a set of PC units n that need to be evaluated in an $i^{th}$ iteration; and
   for i=1 to a dataset D, evaluating PC units n in $eval_i$ using a bottom-up process and computing a target probability; and
   generating a bitstream using a streaming code for the compressed variables using the conditional probabilities.

12. The non-transitory computer readable storage medium of claim 11, wherein sequentially compressing the variable one-by-one using the conditional probabilities comprises encoding a next variable by defining a left and right side cumulative probabilities of the next variable given one or more already encoded variables.

13. The non-transitory computer readable storage medium of claim 12, wherein the left and right side cumulative probabilities are defined using a 2D conditional probability that is a quotient of two marginals.

14. The non-transitory computer readable storage medium of claim 11, wherein calculating the at least one marginal comprises:
   inputting a PC p having a variable instantiation x; and
   outputting a marginal $F(x)=\{p(x_1, \ldots, x_i)\}_{i=1}^{D}$, wherein D is the dataset.

15. The non-transitory computer readable storage medium of claim 14, wherein each of D terms in F(x) is computed one-by-one.

16. The non-transitory computer readable storage medium of claim 15, wherein each iteration on average re-evaluates only log(D)/D of the PC p.

17. The non-transitory computer readable storage medium of claim 11, wherein the evaluating the PC units in $eval_i$ is performed in a feedforward process to compute the target probability.

18. The non-transitory computer readable storage medium of claim 11, wherein at iteration i, a set of PC units $eval_i$ is selected that guarantees correctness of a target marginal, and contains a minimum number of PC units.

19. The non-transitory computer readable storage medium of claim 18, wherein the guarantee of correctness of the target marginal, and containing the minimum number of PC units is achieved by recognizing types of PC units that can be eliminated for evaluation.

20. The non-transitory computer readable storage medium of claim 19, wherein a root node's probability is equivalently computed using a weighted mixture of probabilities of PC units in $eval_i$.

* * * * *